US011059935B2

(12) United States Patent
Nakao et al.

(10) Patent No.: US 11,059,935 B2
(45) Date of Patent: Jul. 13, 2021

(54) ONE COMPONENT POLYURETHANE DISPERSION FOR VINYL WINDOWS AND OTHER SUBSTRATES

(71) Applicant: COVESTRO LLC, Pittsburgh, PA (US)

(72) Inventors: Makoto Nakao, Pittsburgh, PA (US); Tina Kasardo, McKeesport, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 16/549,285

(22) Filed: Aug. 23, 2019

(65) Prior Publication Data

US 2019/0375880 A1    Dec. 12, 2019

Related U.S. Application Data

(63) Continuation-in-part of application No. 15/948,263, filed on Apr. 9, 2018, and a continuation-in-part of application No. 15/945,865, filed on Apr. 5, 2018, and a continuation of application No. 15/667,139, filed on Aug. 2, 2017.

(51) Int. Cl.
| | |
|---|---|
| *C09D 175/06* | (2006.01) |
| *C08G 18/42* | (2006.01) |
| *C08G 18/66* | (2006.01) |
| *C08F 114/06* | (2006.01) |
| *C08G 81/02* | (2006.01) |
| *C08G 18/48* | (2006.01) |
| *C08G 18/65* | (2006.01) |
| *G01N 25/48* | (2006.01) |

(52) U.S. Cl.
CPC ........ *C08G 18/6666* (2013.01); *C08F 114/06* (2013.01); *C08G 18/4211* (2013.01); *C08G 18/48* (2013.01); *C08G 18/6505* (2013.01); *C08G 18/6529* (2013.01); *C08G 18/6603* (2013.01); *C08G 81/021* (2013.01); *C09D 175/06* (2013.01); *G01N 25/4866* (2013.01)

(58) Field of Classification Search
CPC .............. C08G 18/4211; C08G 18/283; C08G 18/6505; C08G 18/6529; C08G 18/6603; C09D 175/06
See application file for complete search history.

(56) References Cited

U.S. PATENT DOCUMENTS

| | | | |
|---|---|---|---|
| 7,021,379 B2 | 4/2006 | Nguyen | |
| 8,614,170 B2 | 12/2013 | Ali et al. | |
| 9,695,071 B2 | 7/2017 | Spurlock | |
| 2002/0026006 A1 | 2/2002 | Garcia et al. | |
| 2003/0158367 A1 | 8/2003 | Weinert et al. | |
| 2006/0111538 A1* | 5/2006 | Coogan .............. | C08G 18/6659 528/44 |
| 2006/0205909 A1* | 9/2006 | O'Brien ............. | C08G 18/4216 528/44 |
| 2006/0241228 A1* | 10/2006 | Gertzmann ............ | C08G 18/12 524/376 |
| 2008/0035024 A1 | 2/2008 | Munzmay et al. | |
| 2009/0240005 A1 | 9/2009 | Kraus et al. | |
| 2012/0130016 A1 | 5/2012 | Argyropoulos et al. | |
| 2013/0143010 A1 | 6/2013 | Buchner et al. | |
| 2013/0269874 A1 | 10/2013 | Buchner et al. | |
| 2014/0249266 A1 | 9/2014 | Grablowitz et al. | |
| 2015/0210807 A1 | 7/2015 | Smits et al. | |
| 2015/0353771 A1 | 12/2015 | Kendi | |
| 2016/0032180 A1 | 2/2016 | Agrawal et al. | |
| 2016/0137773 A1 | 5/2016 | Nazaran et al. | |
| 2017/0226377 A1 | 8/2017 | Jahns et al. | |

FOREIGN PATENT DOCUMENTS

| | | |
|---|---|---|
| EP | 2921541 A1 | 9/2015 |
| WO | 2017003813 A1 | 1/2017 |

* cited by examiner

*Primary Examiner* — Michael L Leonard
(74) *Attorney, Agent, or Firm* — Richard P. Bender; John E. Mrozinski, Jr.; Jed C. Benson

(57) ABSTRACT

The present invention provides an aqueous polyurethane dispersion (PUD) comprising an amorphous polyester having a glass transition temperature ($T_g$) as determined by differential scanning calorimetry of less than −30° C.; wherein the aqueous polyurethane dispersion (PUD) has a glass transition temperature ($T_g$) as determined by differential scanning calorimetry (DSC) of 0° C. to 20° C. and a hard block content of greater than 50%. Coatings, adhesives, sealants, paints, primers and topcoats, made from the inventive aqueous polyurethane dispersion (PUD) pass detergent resistance testing according to the American Architectural Manufacturers Association's standard, AAMA 615-13, have a pencil hardness according to ASTM D3363 of at least 3H, and are particularly suited for use on low surface energy substrates such as vinyl and other surfaces including floors, windows, doors, window frames, door frames, window shutters, railing, gates, pillars, arbors, pergolas, trellises, gazebos, posts, fencing, pipes and fittings, wire and cable insulation, automobile components, credit cards, and siding.

19 Claims, 7 Drawing Sheets

ONE COMPONENT POLYURETHANE DISPERSION FOR VINYL WINDOWS AND OTHER SUBSTRATES

CROSS-REFERENCE TO RELATED APPLICATIONS

This application is a continuation-in-part patent application and claims the benefit of U.S. Ser. No. 15/667,139 filed on Aug. 2, 2017, U.S. Ser. No. 15/945,865 filed on Apr. 5, 2018, and U.S. Ser. No. 15/948,263 filed on Apr. 9, 2018, the entire contents of each of which are incorporated herein by reference.

FIELD OF THE INVENTION

The present invention relates in general to polymers and, more specifically, to one component polyurethane dispersions which adhere well to vinyl and a variety of other substrates.

BACKGROUND OF THE INVENTION

As those skilled in the art are aware, it has proven very difficult to develop coatings which will adhere well to vinyl windows and other substrates. This is because vinyl typically contains plasticizers such as dialkyl phthalates, alkyl aryl phosphates, alkyl aryl phthalates, aryl phosphates, etc., which interfere with the ability of the coating to adhere to the substrate.

In addition to the chemistry-related problems of trying to adhere a coating to vinyl, the American Architectural Manufacturers Association (AAMA) has very stringent standards for window coatings, including those for vinyl windows regarding a variety of parameters such as chemical resistance, detergent resistance, humidity resistance and pencil hardness.

To reduce or eliminate problems with adhering coatings to vinyl and other substrates such as windows, floors, walls, ceilings, textiles, etc., therefore, a need exists in the art for a coating which will adhere to vinyl and other substrates but still provide the necessary chemical, detergent, and humidity resistances and pencil hardness to permit the use in vinyl window and other coatings.

SUMMARY OF THE INVENTION

Accordingly, the present invention addresses problems inherent in the art by providing a durable, chemically-resistant coating that can be applied as a one-component, low VOC system for application to a variety of substrates including, but not limited to, wood, thermoplastics, thermosets, concrete, masonry, textiles, metals, ceramics, composites, and glass.

The present invention provides a one-component polyurethane dispersion (PUD) based on ortho-phthalic based polyester polyols with a range of molecular weights. This chemistry provides or can be used in coatings, adhesives, paints including primers and topcoats, and sealants having excellent chemical resistance, especially with regard to aggressive detergent testing. In addition, this invention provides coatings, adhesives, paints, primers, topcoats, and sealants with augmented adhesion to low-surface energy substrates and improved hardness, while retaining low (or no) volatile organic content. The instant invention provides two-component performance with a one-component coating.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
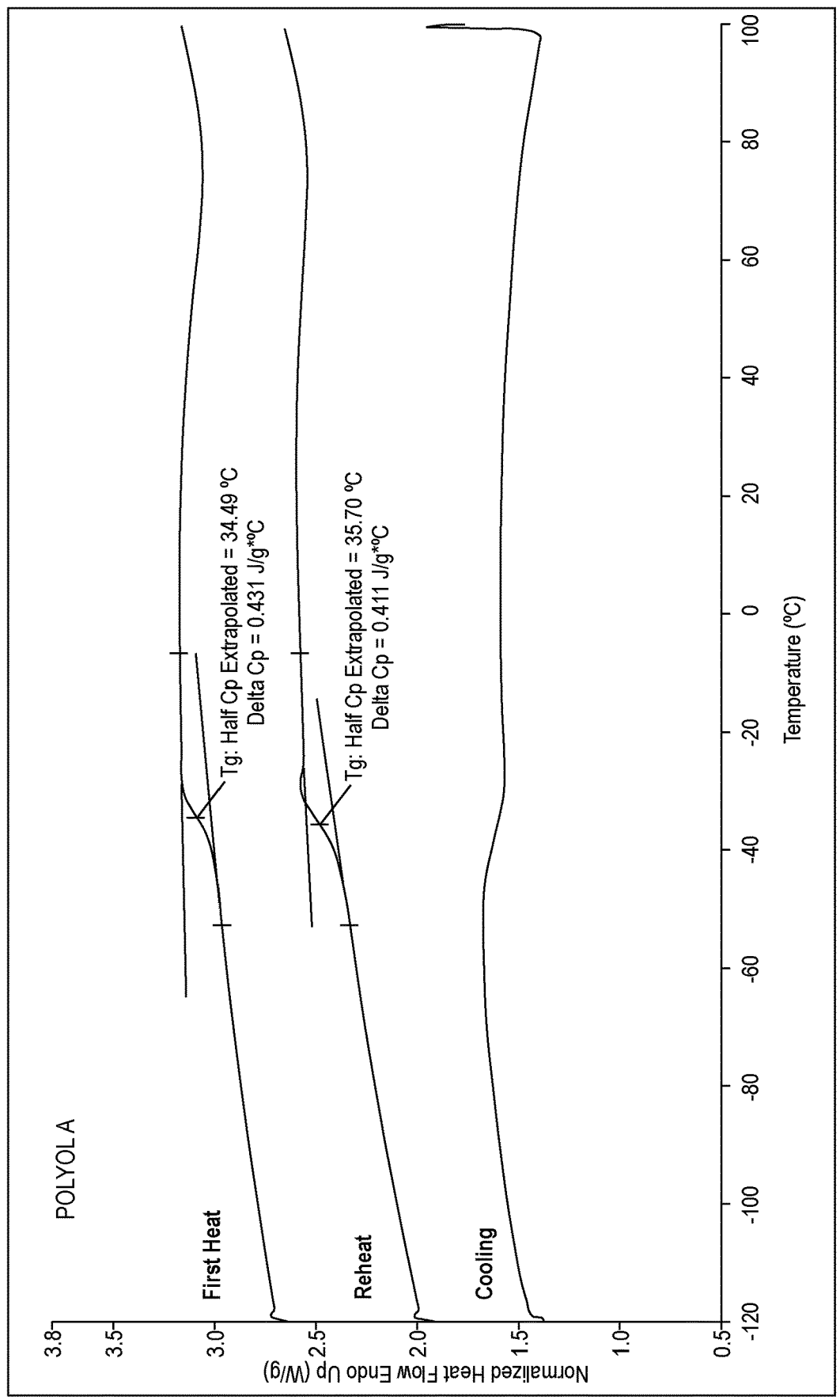
FIG. 1 is a differential scanning calorimetry (DSC) thermogram of POLYOL A.

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicants reserve the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification. The various embodiments disclosed and described in this specification can comprise, consist of, or consist essentially of the features and characteristics as variously described herein.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Although compositions and methods are described in terms of "comprising" various components or steps, the compositions and methods can also "consist essentially of" or "consist of" the various components or steps.

In various non-limiting embodiments, the present invention provides an aqueous polyurethane dispersion (PUD) comprising an amorphous polyester having a glass transition temperature ($T_g$) as determined by differential scanning calorimetry (DSC) of less than −30° C.; wherein the aqueous polyurethane dispersion (PUD) has a glass transition temperature ($T_g$) as determined by differential scanning calorimetry of 0° C. to 20° C. and a hard block content of greater than 50%.

In a first aspect, the present invention is directed to an aqueous polyurethane dispersion (PUD) comprising the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) an amorphous polyester having a glass transition temperature (Tg) as determined by differential scanning calorimetry (DSC) of less than −30° C.; (v) water; (vi) a mono functional polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature (Tg) as determined by differential scanning calorimetry (DSC) of 0° C. to 20° C. and a hard block content of greater than 50%.

In another aspect, the invention is directed to a coating containing an aqueous polyurethane dispersion (PUD), wherein the coating passes detergent resistance testing according to AAMA 615-13 with a minimum 90% gloss retention, a maximum color change of 5 delta E, with no blistering and no loss of adhesion after testing, wherein the coating exhibits no staining by betadine after four hours, wherein the coating passes humidity resistance testing according to ASTM D714 with no blistering and wherein the coating has a pencil hardness according to ASTM D3363 of at least 3H.

In yet another aspect, the invention is directed to a paint comprising an aqueous polyurethane dispersion (PUD), wherein the paint passes detergent resistance testing according to AAMA 615-13 with a minimum 90% gloss retention, a maximum color change of 5 delta E, no blistering and no loss of adhesion after testing, wherein the paint exhibits no staining by betadine after four hours, wherein the paint passes humidity resistance testing according to ASTM D714 with no blistering and wherein the coating has a pencil hardness according to ASTM D3363 of at least 3H.

In still another aspect, the invention is directed to a primer comprising an aqueous polyurethane dispersion (PUD), wherein the primer passes detergent resistance testing according to AAMA 615-13 with a minimum 90% gloss retention, a maximum color change of 5 delta E, no blistering and no loss of adhesion after testing, wherein the primer exhibits no staining by betadine after four hours, wherein the primer passes humidity resistance testing according to ASTM D714 with no blistering and wherein the primer has a pencil hardness according to ASTM D3363 of at least 3H.

In a further aspect, the invention is directed to a topcoat comprising an aqueous polyurethane dispersion (PUD), wherein the topcoat passes detergent resistance testing according to AAMA 615-13 with a minimum 90% gloss retention, a maximum color change of 5 delta E, no blistering and no loss of adhesion after testing, wherein the topcoat exhibits no staining by betadine after four hours, wherein the topcoat passes humidity resistance testing according to ASTM D714 with no blistering and wherein the topcoat has a pencil hardness according to ASTM D3363 of at least 3H.

In a still further aspect, the invention is directed to a low surface energy substrate having applied thereto a coating containing an aqueous polyurethane dispersion (PUD), wherein the coating passes detergent resistance testing according to AAMA 615-13 with a minimum 90% gloss retention, a maximum color change of 5 delta E, no blistering and no loss of adhesion after testing, wherein the coating exhibits no staining by betadine after four hours, wherein the coating passes humidity resistance testing according to ASTM D714 with no blistering and wherein the coating has a pencil hardness according to ASTM D3363 of at least 3H. In some additional aspects a coating containing an aqueous PUD can have good dirt pick-up resistance.

In yet another aspect, the present disclosure describes a coating composition that can include an aqueous polyurethane dispersion (PUD) as described herein, a pigment, and a thickener, wherein the coating composition has a solids content of at least 30 wt % based on a total weight of the coating composition.

In still another aspect, the present disclosure describes a coated substrate that can include a substrate and a coating composition applied to the surface of the substrate to form a surface coating.

In some examples, coatings, adhesives, sealants, paints, primers and topcoats made from the inventive aqueous polyurethane dispersion (PUD) pass detergent resistance testing according to the American Architectural Manufacturers Association's standard, AAMA 615-13, with a minimum 90% gloss retention, maximum color change of 5 delta E, no blistering and no loss of adhesion after testing, exhibits no staining by betadine after four hours, and pass humidity resistance testing according to ASTM D714 with no blistering. The inventive polyurethane dispersions are particularly well suited for use in or as coatings, adhesives, sealants, paints, primers and topcoats applied to vinyl and other substrates, including but not limited to, floors, windows, doors, walls, window frames, window surrounds, door frames, window shutters, railing, gates, pillars, arbors, pergolas, trellises, gazebos, posts, fencing, pipes and fittings, wire and cable insulation, automobile components, credit cards, cladding, siding, or the like. Other suitable substrates include, but are not limited to, wood; plastics such as polyamide (PA), polyethylene (PE), high-density polyethylene (HDPE), low-density polyethylene (LDPE), polyethylene terephthalate (PET), polytetrafluoroethylene (PTFE), polyester (PES), polypropylene (PP), polystyrene (PS), polyvinyl chloride (PVC), polyurethane (PU), thermoplastic polyurethane, epoxy, polycarbonate (PC), acrylonitrile butadiene styrene (ABS), polycarbonate/acrylonitrile butadiene styrene (PC/ABS), polyethylene/acrylonitrile butadiene styrene (PE/ABS), polymethyl methacrylate (PMMA), polybenzimidazole (PBI), polyoxymethylene (POM); drywall; concrete; masonry; textiles; metals; ceramics; composite; glass; or the like.

The present inventors have surprisingly found that coatings, adhesives, sealants, paints, primers, and topcoats, produced from the inventive polyurethane dispersions have excellent chemical resistance properties, especially with regard to aggressive detergent testing. In addition, these dispersions provide coatings, adhesives, sealants, paints, primers, and topcoats with augmented adhesion to low-surface energy substrates and improved hardness properties, while retaining low (or no) volatile organic content.

As used herein, the term "coating composition" refers to a mixture of chemical components that will cure and form a coating when applied to a substrate. As used herein, a "coating" means a layer of any substance spread over a surface.

The terms "adhesive" or "adhesive compound", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant composition" refers to a composition which may be applied to one or more surfaces to form a protective barrier, for example, to prevent ingress or egress of solid, liquid or gaseous material or alternatively to allow selective permeability through the barrier to gas and liquid. In particular, it may provide a seal between surfaces.

A "casting composition" refers to a mixture of liquid chemical components which is usually poured into a mold containing a hollow cavity of the desired shape, and then allowed to solidify.

A "composite" refers to a material made from two or more polymers, optionally containing other kinds of materials. A composite has different properties from those of the individual polymers/materials which make it up.

"Cured," "cured composition" or "cured compound" refers to components and mixtures obtained from reactive curable original compound(s) or mixture(s) thereof which have undergone chemical and/or physical changes such that the original compound(s) or mixture(s) is(are) transformed into a solid, substantially non-flowing material. A typical curing process may involve crosslinking. Suitable crosslinking additives include, but are not limited to, polyisocyanates, aziridines, and carbodiimides.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

As used herein, the term "paint" refers to a substance used for decorating or protecting a surface, and is typically a mixture containing a solid pigment suspended in a liquid, that when applied to a surface dries to form a hard, protective coating.

As used herein, "primer" refers to a substance used as a preparatory coat on previously an unpainted or uncoated surface to prevent the absorption of subsequent layers of coating or paint.

As used herein, "topcoat" refers to a transparent or translucent coat applied over the underlying material as a sealer. In a paint system, the topcoat provides a seal over the intermediate coat(s) and the primer.

As used herein, "polymer" encompasses prepolymers, oligomers and both homopolymers and copolymers; the prefix "poly" in this context referring to two or more. As used herein, "molecular weight", when used in reference to a polymer, refers to the number average molecular weight ("$M_n$"), unless otherwise specified. As used herein, the $M_n$ of a polymer containing functional groups, such as a polyol, can be calculated from the functional group number, such as hydroxyl number, which is determined by end-group analysis.

As used herein, "soft blocks" contain polyethers, polyesters and polycarbonates and "hard blocks" contain urethanes, urea groups, short chain amines, diols and diisocyanates. In some embodiments, the inventive compositions have a hard block content of greater than 50%. In certain other embodiments, the inventive compositions have a hard block content of 50% to 60%. In various embodiments, the inventive compositions have a hard block content of 55% to 60%.

As used herein, the term "aliphatic" refers to organic compounds characterized by substituted or un-substituted straight, branched, and/or cyclic chain arrangements of constituent carbon atoms. Aliphatic compounds do not contain aromatic rings as part of the molecular structure thereof. As used herein, the term "cycloaliphatic" refers to organic compounds characterized by arrangement of carbon atoms in closed ring structures. Cycloaliphatic compounds do not contain aromatic rings as part of the molecular structure thereof. Therefore, cycloaliphatic compounds are a subset of aliphatic compounds. Therefore, the term "aliphatic" encompasses aliphatic compounds and cycloaliphatic compounds.

As used herein, "diisocyanate" refers to a compound containing two isocyanate groups. As used herein, "polyisocyanate" refers to a compound containing two or more isocyanate groups. Hence, diisocyanates are a subset of polyisocyanates.

As used herein, the term "dispersion" refers to a composition comprising a discontinuous phase distributed throughout a continuous phase. For example, "waterborne dispersion" and "aqueous dispersion" refer to compositions comprising particles or solutes distributed throughout liquid water. Waterborne dispersions and aqueous dispersions may also include one or more co-solvents in addition to the particles or solutes and water. As used herein, the term "dispersion" includes, for example, colloids, emulsions, suspensions, sols, solutions (i.e., molecular or ionic dispersions), and the like.

As used herein, the term "aqueous polyurethane dispersion" means a dispersion of polyurethane particles in a continuous phase comprising water. As used herein, the term "polyurethane" refers to any polymer or oligomer comprising urethane (i.e., carbamate) groups, urea groups, or both. Thus, the term "polyurethane" as used herein refers collectively to polyurethanes, polyureas, and polymers containing both urethane and urea groups, unless otherwise indicated.

In various embodiments, the dispersions, coatings, paints, primers, and topcoats of the invention include n-methyl-2-pyrrolidone (NMP) in amounts up to 15 wt. %, in some embodiments up to 10 wt. % in other embodiments up to 7 wt. % and in certain embodiments up to 5 wt. %, based on the total weight of the dispersions, coatings, paints, primers, and topcoats of the present invention. In various other embodiments, the dispersions, coatings, paints, primers, and topcoats are substantially free of NMP. As used herein, the term "substantially free of n-methyl-2-pyrrolidone (NMP)" means the dispersions, coatings, paints, primers, and topcoats comprise in some embodiments, less than 0.2 wt. % NMP, in other embodiments, less than 0.1 wt. % NMP, in yet other embodiments less than 0.01 wt. % NMP, and in some embodiments 0 wt. % NMP, based on the total weight of the dispersions, compositions, coatings, paints, primers and topcoats of the present invention.

In certain embodiments, the aqueous polyurethane dispersion (PUD) that is used in the present invention comprises one or more polyurethanes that are the reaction product of reactants comprising, consisting essentially of, or, in some cases, consisting of: a polyisocyanate; a polymeric polyol having a number average molecular weight ("$M_n$") of 400 to 8,000 g/mol; and a compound comprising at least one isocyanate-reactive group and an anionic group or potentially anionic group.

The present invention is directed to an aqueous polyurethane dispersion (PUD) comprising the reaction product of: (i) a polyisocyanate; (ii) a polymeric polyol having a number average molecular weight of 400 to 8000 g/mol; (iii) a compound comprising at least one isocyanate-reactive group and an anionic group or potentially anionic group; (iv) an amorphous polyester having a glass transition temperature ($T_g$) as determined by differential scanning calorimetry (DSC) of less than −30° C.; (v) water, (vi) a mono functional polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature ($T_g$) as determined by differential scanning calorimetry (DSC) of 0° C. to 20° C. and a hard block content of greater than 50%.

Suitable polyisocyanates (i) include, but are not limited to, aromatic, araliphatic, aliphatic and cycloaliphatic polyisocyanates, such as, for example, 1,4-butylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl)methanes or mixtures thereof of any desired isomer content, 1,4-cyclohexylene diisocyanate, 1,4-phenylene diisocyanate, 2,4- and/or 2,6-toluene diisocyanate or hydrogenated 2,4- and/or 2,6-toluene diisocyanate, 1,5-naphthalene diisocyanate, 2,4'- and 4,4'-diphenylmethane diisocyanate, 1,3- and 1,4-bis-(2-isocyanato-prop-2-yl)-benzene (TMXDI), 1,3-bis(isocyanatomethyl)benzene (XDI), (S)-alkyl 2,6-diisocyanato-hexanoates or (L)-alkyl 2,6-diisocyanatohexanoates.

Polyisocyanates having a functionality >2 can also be used if desired. Such polyisocyanates include modified diisocyanates having a uretdione, isocyanurate, urethane, allophanate, biuret, iminooxadiazine-dione and/or oxadiazinetrione structure, as well as unmodified polyisocyanates having more than 2 NCO groups per molecule, for example 4-isocyanatomethyl-1,8-octane diisocyanate (nonane triisocyanate) or triphenylmethane-4,4',4''-triisocyanate.

In some embodiments of the present invention, polyisocyanates or polyisocyanate mixtures containing only aliphatically and/or cycloaliphatically bonded isocyanate groups are used that have a mean functionality of from 2 to 4, such as 2 to 2.6 or 2 to 2.4.

Polymeric polyols (ii) have a molecular weight $M_n$ of from 400 to 8000 g/mol, such as 400 to 6000 g/mol or, in some cases, 500 to 3000 g/mol, 1000 to 3000 g/mol or 1500 to 3000 g/mol. In certain embodiments, these polymeric polyols have a hydroxyl number of from 20 to 400 mg KOH/g of substance, such as 20 to 300 mg KOH/g of substance, 20 to 200 mg KOH/g of substance or 20 to 100 mg KOH/g of substance. In certain embodiments, these polymeric polyols have a hydroxyl functionality of 1.5 to 6, such as 1.8 to 3 or 1.9 to 2.1. As will be appreciated, the $M_n$ of a polymer containing functional groups, such as a polyol, can, as discussed earlier, be calculated from the functional group number, such as hydroxyl number, which is determined by end-group analysis. "Hydroxyl number", as used herein, is determined according to DIN 53240.

Exemplary polymeric polyols (ii) include, for example, polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols, polyester polycarbonate polyols, phenol/formaldehyde resins, on their own or in mixtures.

Suitable polyether polyols include, for example, the polyaddition products of the styrene oxides, of ethylene oxide, propylene oxide, tetrahydrofuran, butylene oxide, epichlorohydrin, as well as their mixed-addition and graft products, as well as the polyether polyols obtained by condensation of polyhydric alcohols or mixtures thereof and those obtained by alkoxylation of polyhydric alcohols, amines and amino alcohols.

Suitable polyether polyols often have a hydroxyl functionality of 1.5 to 6.0, such as 1.8 to 3.0, a hydroxyl number of 20 to 700 mg KOH/g solid, such as 20 to 100, 20 to 50 or, in some cases 20 to 40 mg KOH/g solid, and/or a $M_n$ of 400 to 4000 g/mol, such as 100 to 4000 or 1000 to 3000 g/mol.

Exemplary polyester polyols are the polycondensation products of di- as well as optionally tri- and tetra-ols and di- as well as optionally tri- and tetra-carboxylic acids or hydroxycarboxylic acids or lactones. Instead of the free polycarboxylic acids it is also possible to use the corresponding polycarboxylic acid anhydrides or corresponding polycarboxylic acid esters of lower alcohols to prepare the polyesters. Examples of suitable diols are ethylene glycol, butylene glycol, diethylene glycol, triethylene glycol, polyalkylene glycols such as polyethylene glycol, further 1,2-propanediol, 1,3-propanediol, 1,3-butanediol, 1,4-butanediol, 1,6-hexanediol and isomers, 1,8-octanediol, neopentyl glycol, 1,4-bishydroxymethyl-cyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A, lactone-modified diols, or hydroxypivalic acid neopentyl glycol ester. In order to achieve a functionality >2, polyols having a functionality of 3 can optionally be used proportionately, for example trimethylolpropane, glycerol, erythritol, pentaerythritol, trimethylolbenzene or trishydroxyethyl isocyanurate.

Suitable dicarboxylic acids are, for example, phthalic acid, isophthalic acid, terephthalic acid, tetrahydrophthalic acid, hexahydro-phthalic acid, cyclohexane-dicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, and/or 2,2-dimethylsuccinic acid. Anhydrides of those acids can likewise be used, where they exist. Thus, for the purposes of the present invention, anhydrides are included in the expression "acid". Monocarboxylic acids, such as benzoic acid and hexanecarboxylic acid, can also be used, provided that the mean functionality of the polyol is ≥2. Saturated aliphatic or aromatic acids can be used, such as adipic acid or isophthalic acid. Trimellitic acid is a polycarboxylic acid which can also optionally be used.

Hydroxycarboxylic acids which can be used as reactants in the preparation of a polyester polyol having terminal hydroxyl groups are, for example, hydroxycaproic acid, hydroxybutyric acid, hydroxydecanoic acid, hydroxystearic acid and the like. Suitable lactones are, for example, ε-caprolactone, butyrolactone and their homologues.

In certain embodiments of the present invention, polymer polyol (ii) comprises or, in some cases, consists essentially of or consists of a polyester diol that is a reaction product of butanediol and one or more of neopentyl glycol, hexanediol, ethylene glycol, and diethylene glycol with adipic acid and one or more of phthalic acid and isophthalic acid, such as polyester polyols that are a reaction product of at least one of butanediol, neopentyl glycol, and hexanediol with at least one of adipic acid and phthalic acid.

Suitable polyester polyols, such as the foregoing polyester diols, often have a hydroxyl functionality of 1.5 to 6.0, such as 1.8 to 3.0, a hydroxyl number of 20 to 700 mg KOH/gram solid, such as 20 to 100, 20 to 80 or, in some cases 40 to 80 mg KOH/g solid, and/or a $M_n$ of 500 to 3000 g/mol, such as 600 to 2500 g/mol.

Exemplary polycarbonate polyols are obtainable by reaction of carbonic acid derivatives, for example diphenyl carbonate, dimethyl carbonate or phosgene, with diols. Suitable diols include the diols mentioned earlier with respect to the preparation of polyester polyols. In some cases, the diol component contains from 40 wt. % to 100 wt. % 1,6-hexanediol and/or hexanediol derivatives, often containing ether or ester groups in addition to terminal OH groups, for example products which are obtained by reaction of one mole of hexanediol with at least one mole, preferably from one to two moles, of ε-caprolactone or by etherification of hexanediol with itself to form di- or tri-hexylene glycol. Polyether polycarbonate polyols can also be used.

The third component of the polyurethane dispersion (PUD) is a compound comprising at least one isocyanate-reactive group and an anionic group or potentially anionic group (iii). Exemplary such compounds are those which contain, for example, carboxylate, sulfonate, phosphonate groups or groups which can be converted into the above-mentioned groups by salt formation (potentially anionic groups), and which can be incorporated into the macromolecules by isocyanate-reactive groups, such as hydroxyl or amine groups, that are present.

Suitable anionic or potentially anionic compounds are, for example, mono- and di-hydroxycarboxylic acids, mono- and di-aminocarboxylic acids, mono- and di-hydroxysulfonic acids, mono- and di-aminosulfonic acids as well as mono- and di-hydroxyphosphonic acids or mono- and di-aminophosphonic acids and their salts, such as dimethylol-propionic acid, dimethylolbutyric acid, hydroxypivalic acid, N-(2-amino-ethyl)-β-alanine, 2-(2-amino-ethylamino)-ethanesulfonic acid, ethylene-diamine-propyl- or -butyl-sulfonic acid, 1,2- or 1,3-propylenediamine-3-ethylsulfonic acid, malic acid, citric acid, glycolic acid, lactic acid. In certain embodiments, the anionic or potentially anionic compounds have at least one of carboxy, carboxylate, and sulfonate groups and have a functionality of from 1.9 to 2.1, such as the salts of 2-(2-aminoethyl-amino)ethanesulfonic acid.

In certain embodiments, component (iii) is used in an amount of at least 0.1% by weight, such as at least 1%, or at least 3% by weight and/or no more than 10% by weight, such as no more than 7% by weight, based on the total weight of reactants used to make the polyurethane.

Amorphous polyesters (iv) are included in the inventive polyurethane dispersion (PUD) which have a glass transition temperature ($T_g$) as determined by differential scanning calorimetry (DSC) of less than −30° C. In various embodiments, these polyesters have a molecular weight of from 300 to 3000. In certain embodiments, these polyesters have a molecular weight of approximately 1000. In some embodiments the amorphous polyester (iv) comprises an orthophthalic anhydride/1,6-hexane diol.

Component (vi) is a mono functional polyalkylene ether that contains at least one, in some cases one, hydroxy or amino group. In some embodiments, component (vi) comprises compounds of the formula:

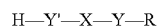

in which R is a monovalent hydrocarbon radical having 1 to 12 carbon atoms, such as an unsubstituted alkyl radical having 1 to 4 carbon atoms; X is a polyalkylene oxide chain having 5 to 90, such as 20 to 70 chain members, which may comprise at least 40%, such as at least 65%, ethylene oxide units and which in addition to ethylene oxide units may comprise propylene oxide, butylene oxide and/or styrene oxide units; and Y and Y' are each independently oxygen or —NR'— in which R' is H or R, in which R is defined above.

Mono functional polyalkylene ethers suitable for use in component (vi) may, in some cases, contain 7 to 55 ethylene oxide units per molecule, and can be obtained by alkoxylation of suitable starter molecules, such as, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl-cyclohexanols or hydroxymethyl-cyclohexane, 3-ethyl-3-hydroxymethyl-oxetan or tetrahydrofurfuryl alcohol; diethylene glycol monoalkyl ethers, such as, for example, diethylene glycol monobutyl ether; unsaturated alcohols, such as allyl alcohol, 1,1-dimethyl-allyl alcohol or oleic alcohol; aromatic alcohols, such as phenol, the isomeric cresols or methoxyphenols; araliphatic alcohols, such as benzyl alcohol, anise alcohol or cinnamic alcohol; secondary monoamines, such as dimethylamine, diethylamine, dipropylamine, diisopropylamine, dibutyl-amine, bis-(2-ethylhexyl)-amine, N-methyl- and N-ethyl-cyclohexylamine or dicyclohexylamine; as well as heterocyclic secondary amines, such as morpholine, pyrrolidine, piperidine or 1H-pyrazole, including mixtures of two or more of any of the foregoing.

Alkylene oxides suitable for the alkoxylation reaction include, for example, ethylene oxide and propylene oxide, which can be used in the alkoxylation reaction in any desired sequence or alternatively in admixture. In some embodiments, component (vi) comprises a copolymer of ethylene oxide with propylene oxide that contains ethylene oxide in an amount of at least 40% by weight, such as at least 50% by weight, at least 60% by weight or at least 65% by weight and/or up to 90% by weight or up to 80% by weight, based on the total weight of ethylene oxide and propylene oxide. In certain embodiments, the $M_n$ of such a copolymer is 300 g/mol to 6000 g/mol, such as 500 g/mol to 4000 g/mol, such as 1000 g/mol to 3000 g/mol.

In certain embodiments, component (vi) is used in an amount of at least 1% by weight, such as at least 5%, or at least 10% by weight or no more than 30% by weight, such as no more than 20% by weight, based on the total weight of reactants used to make the polyurethane.

Component (vii) comprises a polyol having a molecular weight of less than <400 grams/mol. Examples of such polyols include, without limitation, the diols mentioned earlier with respect to the preparation of polyester polyols. In some cases, the polyol having a molecular weight of less than <400 g/mol has up to 20 carbon atoms, such as is the case with, for example, ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-hydroxy-phenyl)propane), hydrogenated bisphenol A, (2,2-bis(4-hydroxycyclo-hexyl)propane), trimethylolpropane, glycerol, pentaerythritol and also any desired mixtures of two or more thereof. Also suitable are ester diols of the specified molecular weight range such as α-hydroxybutyl-ε-hydroxy-caproic acid ester, ω-hydroxyhexyl-γ-hydroxybutyric acid ester, β-hydroxy-ethyl adipate or bis(β-hydroxyethyl) terephthalate.

In certain embodiments, component (vii) is used in an amount of at least 1% by weight, such as at least 2%, or at least 3% by weight and/or no more than 20% by weight, such as no more than 10% or no more than 5% by weight, based on the total weight of reactants used to make the polyurethane.

Component (viii) is used for chain extension and includes di- or poly-amines as well as hydrazides, for example ethylenediamine, 1,2- and 1,3-diaminopropane, 1,4-diaminobutane, 1,6-diaminohexane, isophorone-diamine, isomer mixture of 2,2,4- and 2,4,4-trimethyl-hexamethylene-diamine, 2-methylpentamethylenediamine, diethylenetriamine, 1,3- and 1,4-xylylenediamine, α,α,α',α'-tetramethyl-1,3-and-1,4-xylylenediamine and 4,4-di-aminodicyclohexylmethane, dimethylethylenediamine, hydrazine or adipic acid dihydrazide. Also suitable for use are compounds which contain active hydrogen of different reactivity towards NCO groups, such as compounds which contain, in addition to a primary amino group, also secondary amino groups or, in addition to an amino group (primary or secondary), also OH groups. Examples thereof are primary/secondary amines, such as 3-amino-1-methyl-amino-propane, 3-amino-1-ethylaminopropane, 3-amino-1-cyclohexylaminopropane, 3-amino-1-methylaminobutane, also alkanolamines such as N-aminoethylethanol-amine, ethanolamine, 3-aminopropanol or neopentanolamine.

In certain embodiments, component (viii) is used in an amount of at least 1% by weight, such as at least 3% or at least 5% by weight and no more than 10% by weight, such as no more than 8% or, in some cases, no more than 7% by weight, based on the total weight of reactants used to make the polyurethane.

In various non-limiting embodiments of the present invention, the aqueous polyurethane dispersion (PUD) has a glass transition temperature ($T_g$) as determined by differential scanning calorimetry (DSC) of 0° C. to 20° C. and a hard block content of greater than 50%. In certain embodiments, the hard block content is from 50% to 60% and in a preferred embodiment, the hard block content is from greater than 55% to 60%.

Any of a variety of processes can be used to prepare the aqueous polyurethane dispersion (PUD) of the present invention, such as the prepolymer mixing method, acetone method or melt dispersing method, each of which will be understood by a person skilled in the art of making aqueous polyurethane dispersions. For example, in some embodiments, the aqueous polyurethane dispersions of the present invention may be produced by the acetone method, such as is described, for example, in U.S. Patent Application Publication No. 2007/0167565 A1 at [0057]-[0073], the cited portion of which being incorporated herein by reference.

In certain embodiments, the resin solids content of the aqueous polyurethane dispersion (PUD) prepared by any of these methods is at least 20% by weight, such as at least 25% or at least 30% by weight or no more than 65% by weight, such as no more than 50% or no more than 45% by weight, based on the total weight of the dispersion.

Among the possible applications for the inventive aqueous polyurethane dispersion (PUD) is in or as a coating or coating composition, paint, primer or topcoat for application on a frame or other component of an architectural article, such as a vinyl door, door frame, floor, wall, ceiling, window, window frame, window surrounds, window shutters, railing, gates, pillars, arbors, pergolas, trellises, gazebos, posts, fencing, cladding and siding, particularly those that are constructed of a material such as polyvinylchloride (PVC). In certain embodiments, the aqueous polyurethane dispersion (PUD) of the present invention may produce a cured coating that, when used on a frame or other component of an architectural article, such as a door or window, meets or exceeds many if not all of the requirements of AAMA specification 615-13, "Voluntary Specification, Performance Requirements and Test Procedures for Superior Performing Organic Coatings on Plastic Profiles", (referred to herein as "AAMA 615-13"). For example, cured coatings, primers, and topcoats made from the aqueous polyurethane dispersion (PUD) of the present invention, when deposited over a low surface energy synthetic substrate, such as polyvinylchloride (PVC), may pass the detergent resistance test described in AAMA 615-13. In certain other embodiments, the aqueous polyurethane dispersion (PUD) of the present invention may be applied to any of a variety of substrates including, but not limited to, wood; plastics such as polyamide (PA), polyethylene (PE), high-density polyethylene (HDPE), low-density polyethylene (LDPE), polyethylene terephthalate (PET), polytetrafluoroethylene (PTFE), polyester (PES), polypropylene (PP), polystyrene (PS), polyvinyl chloride (PVC), polyurethane (PU), thermoplastic polyurethane, epoxy, polycarbonate (PC), acrylonitrile butadiene styrene (ABS), polycarbonate/acrylonitrile butadiene styrene (PC/ABS), polyethylene/acrylonitrile butadiene styrene (PE/ABS), polymathic methacrylate (PMMA), polybenzimidazole (PBI), polyoxymethylene (POM); concrete; masonry; textiles; metals; ceramics; composites; glass; or the like.

As used herein, "vinyl" means materials made by polymerizing an alkene group into a chain. Examples of vinyl compounds include, but are not limited to, polyvinylchloride, polystyrene, polyvinyl acetate, polyvinyl alcohol, and polyacrylonitrile.

As used herein, "low surface energy", when used to describe a substrate, in certain embodiments means a material having a surface energy of from 12 mJ/m$^2$ to 60 mJ/m$^2$; in other embodiments, the material has a surface energy of from 25 mJ/m$^2$ to 45 mJ/m$^2$; and in yet other embodiments, the material has a surface energy of 30 mJ/m$^2$ to 40 mJ/m$^2$. Representative low surface energy materials include the vinyl materials listed above and polyhexafluoropropylene, polytetrafluoroethylene, poly(vinylidene fluoride), poly(chlorotrifluoroethylene), polyethylene, polypropylene, poly(methylmethacrylate), polyamide, poly(vinylidene chloride), poly(ethylene terephthalate), epoxy, phenol-resorcinol resin, styrene-butadiene rubber, and acrylonitrile-butadiene rubber.

The aqueous polyurethane dispersions (PUDs), coatings or coating compositions, adhesives, and sealants of the present invention may further include any of a variety of additives such as defoamers, devolatilizers, thickeners, flow control additives, colorants (including pigments and dyes), surfactants, dispersants, and neutralizers as is known to those skilled in the art.

The aqueous polyurethane dispersions (PUDs), coatings or coating compositions, primers and topcoats of the present invention may be admixed and combined with the conventional paint-technology binders, auxiliaries and additives, selected from the group of pigments, dyes, matting agents, flow control additives, wetting additives, slip additives, pigments, including metallic effect pigments, fillers, nanoparticles, light stabilizing particles, anti-yellowing additives, thickeners, and additives for reducing the surface tension.

The aqueous polyurethane dispersions (PUDs), coatings or coating compositions, adhesives, paints, primers, topcoats, and sealants according to the invention can be applied to the substrate by the conventional techniques, such as, spraying, rolling, flooding, printing, knife-coating, pouring, brushing and dipping.

One example of a coating composition can include a PUD as described herein and a pigment. Further, the coating composition can have a solids content of at least 30 wt % based on a total weight of the coating composition. Thus, a PUD as described herein can be employed to formulate a variety of coating compositions including a pigment and that have a solids content of at least 30 wt % based on a total weight of the coating composition.

In further detail, the PUD can be included in the coating composition in a variety of amounts. For example, the PUD can generally be present in the coating composition in an amount sufficient to impart one or more of the benefits disclosed herein. For example, in some cases, PUD solids can include from about 35 wt % to about 70 wt % of total solids content of the coating composition. In other examples, PUD solids can include from about 40 wt % to about 60 wt % of total solids content of the coating composition. In still other examples, PUD solids can include from about 35 wt % to about 55 wt % or from about 45 wt % to about 65 wt % of total solids content of the coating composition.

The coating composition can generally include from about 35 wt % to about 70 wt % solids based on a total weight of the coating composition. In some examples, the coating composition can include from about 40 wt % to about 60 wt % solids based on a total weight of the coating composition. In some additional examples, the coating composition can include from about 40 wt % to about 50 wt % solids, from about 45 wt % to about 55 wt % solids, or from about 50 wt % to about 60 wt % solids based on a total weight of the coating composition.

Additionally, the coating composition can generally have a density of from about 5 pounds per gallon (lbs/gal) to about 15 lbs/gal. In some additional examples, the coating composition can have a density of from about 8 lbs/gal to about 12 lbs/gal. In still other examples, the coating composition can have a density of from about 5 lbs/gal to about 10 lbs/gal, from about 7 lbs/gal to about 13 lbs/gal, or from about 10 lbs/gal to about 15 lbs/gal.

The coating composition can generally form an architectural coating, paint, primer, topcoat composition, or the like. In some specific examples, the coating composition can include a pigment. Where this is the case, a variety of pigments can be included in the coating composition. Suitable pigments can include organic pigments, inorganic pigments, natural pigments, synthetic pigments, or a combination thereof. Non-limiting examples can include a black pigment, a blue pigment, a brown pigment, a gold pigment, a green pigment, a grey pigment, an orange pigment, a pink pigment, a red pigment, a violet pigment, a white pigment, a yellow pigment, the like, or a combination thereof.

Non-limiting examples of black pigments can include carbon black, ivory black, vine black, lamp black, mars black, titanium black, manganese dioxide, the like, or a combination thereof.

Non-limiting examples of blue pigments can include ultramarine blue, Persian blue, cobalt blue, cerulean blue, Egyptian blue, han blue, azurite, Prussian blue, YInMn blue, manganese blue, phthalocyanine blue, the like, or a combination thereof.

Non-limiting examples of brown pigments can include raw umber, raw sienna, the like, or a combination thereof.

Non-limiting examples of gold pigments can include bronze powder, copper alloy, metallic gold, the like or a combination thereof.

Non-limiting examples of green pigments can include cadmium green, chrome green, viridian, cobalt green, malachite, Scheele's green, green earth, the like, or a combination thereof.

Non-limiting examples of grey pigments can include bismuth powder, iron powder, metallic silver, stainless steel powder, aluminum powder, metallic lead, pewter, metallic zinc, the like, or a combination thereof.

Non-limiting examples of orange pigments can include cadmium orange, chrome orange, the like or a combination thereof.

Non-limiting examples of pink pigments can include coral pink, pearl pink, pink mica, purpurite, the like, or a combination thereof.

Non-limiting examples of red pigments can include realgar, cadmium red, sanguine, caput mortuum, indian red, venetian red, oxide red, red ochre, burnt sienna, minium, vermilion, quinacridone, the like, or a combination thereof.

Non-limiting examples of violet pigments can include ultramarine violet, han purple, phthalo blue, cobalt violet, manganese violet, purple of cassius, the like, or a combination thereof.

Non-limiting examples of white pigments can include antimony white, barium sulfate, lithopone, cremnitz white, titanium white, zinc white, the like, or a combination thereof.

Non-limiting examples of yellow pigments can include orpiment, primrose yellow, cadmium yellow, chrome yellow, aureolin, yellow ochre, naples yellow, lead-tin-yellow, titanium yellow, mosaic gold, zinc yellow, the like, or a combination thereof.

Pigments can be included in the coating composition in a variety of amounts to achieve a desired composition color. In some examples, the pigment can be present in the coating composition in an amount of from about 5 wt % to about 30 wt % based on a total weight of the coating composition. In other examples, the pigment can be present in the coating composition in an amount of from about 10 wt % to about 25 wt % based on a total weight of the coating composition. In still other examples, the pigment can be present in the coating composition in an amount of from about 5 wt % to about 20 wt %, from about 10 wt % to about 30 wt %, or from about 15 wt % to about 25 wt % based on a total weight of the coating composition.

In additional examples, the pigment can be present in the coating composition in an amount of from about 15 wt % to about 65 wt % based on a total solids content of the coating composition. In other examples, the pigment can be present in the coating composition in an amount of from about 25 wt % to about 55 wt % based on a total solids content of the coating composition. In still further examples, the pigment can be present in the coating composition in an amount of from about 15 wt % to about 35 wt %, from about 25 wt % to about 45 wt %, from about 35 wt % to about 55 wt %, or from about 45 wt % to about 65 wt % based on a total solids content of the coating composition.

In some further examples, the coating composition can include a thickener or thickening agent. A thickener can be employed to impart a suitable viscosity, flow properties, coating properties, the like, or a combination thereof to the coating composition.

A variety of suitable thickeners can be included in the coating compositions described herein. Non-limiting examples can include a cellulosic thickening agent, an acrylic thickening agent, an associative thickening agent, a clay thickening agent, guar, alginate, pectin, xanthene, tragacanth, starch, the like, or a combination thereof.

Non-limiting examples of cellulosic thickening agents can include methylcellulose (MC), hydroxyl ethyl cellulose (HEC), methyl hydroxy ethyl cellulose (MHEC), hydroxy propyl cellulose (HPC), hydroxyl propyl methyl cellulose (HPMC), carboxy methyl cellulose (CMC), ethyl hydroxy ethyl cellulose (EHEC), carboxy methyl hydroxy ethyl cellulose (CMHEC), aminated celluloses, the like, or a combination thereof.

Non-limiting examples of acrylic thickening agents can include various polymers including acrylate repeat units, methacrylate repeat units, alkyl acrylate repeat units, alkyl methacrylate repeat units, the like, or a combination thereof. Acrylic thickening agents can generally have a weight average molecular weight that is suitable to impart a desirable viscosity to the coating composition when added at concentration levels as described herein.

Associative thickening agents are thickeners that bond to, crosslink with, or otherwise associate with other components of the coating composition in a manner that increases the viscosity of the coating composition. For example, in some cases, a hydrophobic or hydrophilic functional group of the associative thickening agent can bind with a functional group of another component of the coating composition to increase the viscosity of the coating composition. Non-limiting examples of associative thickening agents can include acrylic thickening agents, urethane thickening agents, hydrophobically modified hydroxy ethyl cellulose, hydrophobically modified polyacrylamide, the like, or a combination thereof.

A variety of clay thickening agents can also be employed. Non-limiting examples of clay thickening agents can include attapulgite, hectorite, bentonite, kaolin, the like, or a combination thereof.

The thickener can be present in the coating composition in a variety of amounts. In some examples, the thickener can be present in the coating composition in an amount of from about 0.1 wt % to about 3 wt % based on a total weight of the coating composition. In other examples, the thickener is present in the coating composition in an amount of from about 0.5 wt % to about 2.5 wt % based on a total weight of the coating composition. In additional examples, the thickener is present in the coating composition in an amount of from about 1 wt % to about 2 wt % based on a total weight of the coating composition.

In other examples, thickener solids can be present in the coating composition in an amount of from about 1 wt % to about 7 wt % based on total solids content of the coating composition. In still other examples, thickener solids can be present in the coating composition in an amount of from about 1.5 wt % to about 6 wt % based on total solids content of the coating composition. In yet other examples, thickener solids can be present in the coating composition in an amount of from about 2 wt % to about 5 wt % based on total solids content of the coating composition. In some examples, thickener solids can be present in the coating composition in an amount of from about 1 wt % to about 5 wt %, from about 2 wt % to about 6 wt %, or from about 2 wt % to about 4 wt % based on total solids content of the coating composition.

In still additional examples, the coating composition can include a matting agent. A matting agent can be included in the coating composition where it is desirable to decrease the gloss of the coating or to impart a matte finish to the coating. Matting agents can be organic, inorganic, natural, synthetic, or a combination thereof. Non-limiting examples of matting agents can include a silica matting agent, a wax matting agent, a filler matting agent, the like, or a combination thereof. Non-limiting examples of silica matting agents can include amorphous silica, low crystalline silica, micronized silica, precipitated silica, an alumina silicate, other silicates, the like, or a combination thereof. Non-limiting examples of wax matting agents can include a beeswax, a polyethylene wax, a polypropylene wax, a hydrophilic polyolefin waxe, a blend of an acrylic resin and a polyolefin wax, the like, or a combination thereof. Non-limiting examples of filler matting agents can include diatomite (diatomaceous earth), calcium carbonate, barium sulfate, clay, cristobalite, dolomite, feldspar, glass powder, kaolin, mica, quartz, talc, microspheres, the like, or a combination thereof.

The matting agent can be present in the coating composition in a variety of amounts. In some examples, the matting agent can be present in the coating composition in an amount of from about 0.1 wt % to about 3 wt % based on a total weight of the coating composition. In other examples, the matting agent can be present in the coating composition in an amount of from about 0.5 wt % to about 2.5 wt % based on a total weight of the coating composition. In additional examples, the matting agent can be present in the coating composition in an amount of from about 1 wt % to about 2 wt % based on a total weight of the coating composition.

In other examples, matting agent solids can be present in the coating composition in an amount of from about 1 wt % to about 7 wt % based on total solids content of the coating composition. In still other examples, matting agent solids can be present in the coating composition in an amount of from about 1.5 wt % to about 6 wt % based on total solids content of the coating composition. In yet other examples, matting agent solids can be present in the coating composition in an amount of from about 2 wt % to about 5 wt % based on total solids content of the coating composition. In some examples, matting agent solids can be present in the coating composition in an amount of from about 1 wt % to about 5 wt %, from about 2 wt % to about 6 wt %, or from about 2 wt % to about 4 wt % based on total solids content of the coating composition.

Where both a thickener and a matting agent are included in the coating composition, the thickener and matting agent can generally be present in the coating composition at a weight ratio of from about 1:2 to about 2:1. In other examples, the thickener and the matting agent can be present in the coating composition at a weight ratio of from about 1:1.5 to about 1.5:1, or from about 1:1.2 to about 1.2:1.

In some additional examples, the coating composition can include a wetting agent. A "wetting agent" as used herein can include a wetting agent, a dispersing agent, or both. Specifically, a wetting agent can include an agent that can be added to a composition to lower a surface tension thereof. For example, in some cases, a wetting agent can facilitate the displacement of air surrounding solid particles to lower the surface tension of the surrounding liquid as compared to the surface energy of the solid particles. A dispersing agent can help prevent flocculation. For example, in some cases, solid particles can attract each other to form aggregates. A dispersing agent can associate with the solid particles in a manner to minimize aggregation of solid particles and facilitate repulsion between solid particles. In some examples, a wetting agent can function as both a wetting agent and a dispersing agent.

A variety of wetting agents can be employed in the coating composition. Non-limiting examples can include hydrocarbon-based surfactant (e.g., sodium dodecyl sulphate, dodecyltrimethyl-ammonium bromide, hexadecyltrimethyl-ammonium bromide, or the like), silicone-based surfactant (e.g., including polysiloxane, polydimethylsiloxane, silicone glycol surfactants, silicone polyether copolymers, or the like), acetylenic surfactant, alkoxylate surfactant, polymeric wetting agent (e.g., acrylate derivatives, maleate derivatives, or the like), the like, or a combination thereof.

Where a wetting agent is included, the wetting agent can generally be included in the coating composition in an amount of from about 0.1 wt % to about 3 wt % based on a total weight of the coating composition. In other examples, the wetting agent can be included in the coating composition in an amount of from about 0.3 wt % to about 2 wt % based on a total weight of the coating composition. In still other examples, the wetting agent can be included in the coating composition in an amount of from about 0.5 wt % to about 1.5 wt %.

In some further examples, the coating composition can include a leveling agent. Leveling agents can help minimize craters, pinholes, loss of gloss, inter-coating adhesion problems, and/or the like to provide a more level or uniform coating surface.

A variety of leveling agents can be employed in the coating compositions described herein. Non-limiting examples can include silicon-based leveling agents (e.g., including polysiloxane, polydimethylsiloxane, silicone glycol surfactants, silicone polyether copolymers, or the like), acrylate-based agents (e.g., including polyacrylate, polyacrylate copolymer, fluorocarbon-modified polyacrylate, polyacrylate adsorbed on silica particle, or the like), fluorocarbon-based agents (e.g., fluorosurfactant, fluorinated ether acrylate, fluorinated polyether, fluoroaliphatic polyoxyethylene, or the like), hydrocarbon-based agents (e.g., sodium dodecyl sulphate, dodecyltrimethyl-ammonium bromide, hexadecyltrimethyl-ammonium bromide, oxyethylated alcohol, or the like), the like, or a combination thereof.

Where a leveling agent is included in the coating composition, it can generally be present in an amount of from about 0.01 wt % to about 1 wt % based on a total weight of the coating composition. In other examples, the leveling agent can be included in the coating composition in an amount of from about 0.05 wt % to about 0.5 wt % based on a total weight of the coating composition. In still further examples, the leveling agent can be included in the coating composition in an amount of from about 0.07 wt % to about 0.3 wt % based on a total weight of the coating composition.

In some examples, the coating composition can have a pigment to binder ratio of from about 0.7 to about 1.7, which can be calculated by dividing total pigment and filler solids by total binder solids. In additional examples, the coating composition can have a pigment to binder ratio of from about 0.8 to about 1.5. In yet additional examples, the coating composition can have a pigment to binder ratio of from about 0.9 to about 1.3. In some specific examples, the coating composition can have a pigment to binder ratio of from about 0.8 to about 1.1, from about 0.9 to about 1.2, or from about 1.0 to about 1.3.

In some examples, the coating composition can have a pigment volume concentration of from about 20% to about 40%. In still other examples, the coating composition can have a pigment volume concentration of from about 22% to about 35%. In still other examples, the coating composition can have a pigment volume concentration of from about 25% to about 32%. The pigment volume concentration represents the volume percentage of solid particles in the coating composition. Thus, the pigment volume concentration can be calculated by dividing the total volume of pigment and filler in the coating composition by the total volume of pigment, filler, and non-volatile components of the coating composition.

The coating compositions described herein can be used to form a coated substrate. The coated substrate can include a substrate as disclosed herein having the coating composition applied to a surface of the substrate to form a surface coating. In some examples of the coated substrate, a coating composition can be applied directly to the substrate. In other examples, a primer composition or the like can be applied directly to the substrate and the coating composition can be applied to the primer composition. Any suitable primer composition can be employed.

In some examples, the surface coatings can provide a variety of beneficial properties to the coated substrate. For example, where a matting agent is employed in the coating composition, the surface coating can typically have a 60° gloss value of less than or equal to 25. In other examples, the surface coating can have a 60° gloss value of less than or equal to 20. In still further examples, the surface coating can have a 60° gloss value of less than or equal to 15 or less than or equal to 10. 60° gloss values can be determined using a variety of suitable gloss meters, such a Micro-TRI-gloss meter manufactured by BYK Gardener Corp., for example.

Additionally, the surface coating can provide good dirt pick-up resistance (DPUR). Generally, a white coating can be drawn down on a scrub test panel at approximately 7 mils wet and subsequently cured at constant room temperature (24° Celsius/50% RH) for seven days. An initial color measurement of the coated test panel can be performed to establish a baseline. A dirt slurry mixture including three iron oxide pigments is painted onto a designated portion of the coating using a brush. The slurry is left to dry on the panel for 24 hours. The slurry is then washed off under tepid, running water while wiping gently with a wet, absorbent cloth. A final color measurement is then taken and the delta yellowness index is recorded.

With this in mind, the surface coating can generally have a DPUR value of less than or equal to 10. In additional examples, the surface coating can have a DPUR value of less than or equal to 8. In still other examples, the surface coating can have a DPUR value of less than or equal to 5, less than or equal to 3, less than or equal to 2, or less than or equal to 1.

The surface coating can also have or provide a variety of other properties as described previously with respect to compositions or coatings including a PUD as described herein.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated.

| | |
|---|---|
| POLYOL A | ortho-phthalic anhydride/1,6-hexane diol, having a molecular weight of 1000, commercially available from Stepan Co. as STEPANPOL PC-1028-115; |
| POLYOL B | adipic acid/1,6-hexane diol, having a molecular weight of 840, commercially available from Covestro as DESMOPHEN 84H; |
| POLYOL C | polytetramethylene ether glycol (PTMEG), having a molecular weight of 1000, commercially available from INVISTA as TERATHANE 1000; |
| POLYOL D | a polycarbonate diol/1,6-hexanediol, having a molecular weight of 1000, commercially available from Covestro as DESMOPHEN C2100; |
| POLYOL E | a DMC-catalyzed, polyether polyol based on propylene glycol and propylene oxide having a hydroxyl number of about 111 mg KOH/g and a functionality of about 2, commercially available from Covestro as ARCOL PPG 1000; |
| POLYOL F | a butyl-diglycol based PO/EO (15.6%/63.5%) monol capped with EO (20.9%) having a hydroxyl number of about 25 mg KOH/g, commercially available from Covestro as POLYETHER LB-25; |
| ISOCYANATE A | 4,4'-dicyclohexylmethane diisocyanate having an NCO group content of about 31.8% and a functionality of about 2, commercially available from Covestro as DESMODUR W; |
| SURFACTANT A | a nonionic wetting agent and molecular defoamer (75% active liquid in ethylene glycol) commercially available from Air Products as SURFYNOL 104H; |
| ADDITIVE A | dimethylolpropionic acid (DMPA); |
| ADDITIVE B | neopentylglycol (NPG); |
| ADDITIVE C | triethylamine (TEA); |
| SOLVENT A | n-methyl-2-pyrrolidone (NMP); |
| SOLVENT B | acetone; |
| EXTENDER A | diethylenetriamine (DETA); |
| EXTENDER B | hydrazine hydrate, 64% (HyHy); and |
| EXTENDER C | ethylenediamine (EDA). |

Example 1

Table I provides the formulations used in the examples along with their properties. Each polyurethane dispersion A-E was made by a prepolymer process involving charging the specified amounts of the relevant POLYOL A-E, POLYOL F and ADDITIVE A and ADDITIVE B to a reaction vessel and heating the vessel to 70° C. The specified amount of ISOCYANTE A was added to the vessel and the vessel observed for an exothermic reaction. When the exothermic reaction was observed, the vessel was maintained at 95° C. The mixture was sampled and assessed for percent NCO. The mixture was cooled to 80° C. an d another sample removed and assessed for percent NCO. The specified amounts of ADDITIVE C and ADDITIVE D were added to the mixture and mixed for 20 minutes. The resultant prepolymer was dispersed in the specified amount of water along with the specified amount of SURFACTANT A. EXTENDERS A, B and C were added dropwise and the mixture mixed for one hour while cooling to room temperature. The polyurethane dispersion was filtered through a 50 µm filter before use.

To make polyurethane dispersion F, an acetone process was followed in which the specified amounts of POLYOL A, POLYOL F, ADDITIVE A, and ADDITIVE B were charged to the reaction vessel and the vessel heated to 65° C. ISOCYANATE A was added to the vessel and the vessel observed for an exothermic reaction. When the exothermic reaction was observed, the vessel was maintained at 95° C. The mixture was sampled and assessed for percent NCO. SOLVENT B was added and the temperature was maintained at 50° C. Another sample removed and assessed for percent NCO. ADDITIVE C was added to neutralize the mixture and EXTENDERS A, B and C were added dropwise and the mixture stirred. The resultant material was dispersed in the specified amount of water and vacuum distilled.

TABLE I

| | Ex. A | Ex. B | Ex. C | Ex. D | Ex. E | Ex. F |
|---|---|---|---|---|---|---|
| POLYOL A | 664.7 | | | | | 136.1 |
| POLYOL B | | 259.2 | | | | |
| POLYOL C | | | 264.3 | | | |
| POLYOL D | | | | 264.3 | | |
| POLYOL E | | | | | 264.1 | |
| POLYOL F | 57.7 | 22.5 | 22.9 | 22.9 | 22.9 | 11.8 |
| ADDITIVE A | 63.3 | 25.3 | 25.3 | 25.3 | 25.3 | 13.0 |
| ADDITIVE B | 68.9 | 26.9 | 27.4 | 27.4 | 27.4 | 14.1 |
| SOLVENT A | 350 | 139.90 | 140 | 140 | 139.93 | |
| SOLVENT B | | | | | | 599.28 |
| ADDITIVE C | 47.8 | 19.1 | 19.1 | 19.1 | 19.16 | 8.81 |
| EXTENDER A | 21.5 | 8.4 | 8.6 | 8.6 | 8.55 | 4.41 |
| EXTENDER B | 21.5 | 8.4 | 8.6 | 8.6 | 8.55 | 4.41 |
| EXTENDER C | 19.4 | 7.6 | 7.7 | 7.7 | 8.55 | 3.97 |
| WATER, DI | 2885.9 | 1157.90 | 1157.80 | 1157.80 | 1157.30 | 641.58 |
| SURFACTANT A | 8.6 | 3.4 | 3.4 | 3.4 | 3.42 | |
| ISOCYANATE A | 790.8 | 321.5 | 314.9 | 314.9 | 314.77 | 161.89 |
| Properties | | | | | | |
| % NCO | 5.04 | 4.88 | 5.04 | 5.04 | 5.04 | 2.15 |
| NCO/OH+NH | 1.04 | 1.03 | 1.04 | 1.04 | 1.03 | 1.03 |

TABLE I-continued

|  | Ex. A | Ex. B | Ex. C | Ex. D | Ex. E | Ex. F |
|---|---|---|---|---|---|---|
| NCO:OH | 1.65 | 1.60 | 1.65 | 1.65 | 1.65 | |
| % NMP | 7.0 | 7.0 | 7.0 | 7.0 | 7.00 | 0 |
| % COOH | 1.25 | 1.25 | 1.25 | 1.25 | 1.26 | 1.25 |
| % Solids | 34.00 | 33.84 | 34.4 | 34.42 | 33.86 | 34.80 |
| Chain ext. % | 90.19 | 91.09 | 90.02 | 90.02 | 93.08 | 91.47 |
| % neutralization | 100 | 100 | 100 | 100 | 100.21 | 90.08 |

Films were made from the formulations for testing. The film thickness was 6 mils (wet) and the films were dried at 50° C. for 10 minutes (except for drying time at room temperature). All testing followed after an additional seven day rest at ambient temperature. When films were made on vinyl substrate for AAMA 615-13 test (Table IV), the following surface preparation method was conducted: the vinyl substrate was wiped with lacquer thinner, IPA and acetone.

Dry times were measured by a dry time recorder (DT-5040) manufactured by the Paul N. Gardner Co., Inc. For assessing film hardness, pendulum hardness was measured by a pendulum damping tester (Model 299/300) manufactured by Erichsen GmbH & Co. KG and microhardness was measured by a microhardness instrument (Fisherscope HM 2000) manufactured by Fischer Technology Inc.

For determining flexibility, mandrel bending was measured by conical mandrel bend test and by BYK impact test.

As can be appreciated by reference to Table II, there appeared to be no significant difference with dry time, film hardness (on glass) or flexibility possibly due to higher hard block content with all aqueous polyurethane dispersions (PUDs).

Chemical resistance was measured by a 24-hour spot test of the indicated chemical on glass.

Humidity resistance was measured by exposing the film to 38° C. at 100% Relative Humidity for 168 hours and assessing for blisters according to ASTM D714.

As can be appreciated by reference to Table III, the POLYOL A-based aqueous polyurethane dispersion (PUD) had comparable chemical resistance to that of the POLYOL D-based aqueous polyurethane dispersion (PUD), but the POLYOL A-based aqueous polyurethane dispersion (PUD) showed better humidity resistance.

Pencil hardness on vinyl was determined according to ASTM D3363.

Adhesion on vinyl was determined by the crosshatch adhesion test as described in ASTM D 3359.

Detergent resistance was measured as described in AAMA 615-13 after 72 hours immersion at 38° C. for its effect on gloss retention as determined by a gloss meter (Micro-TRI-gloss) manufactured by BYK Gardner GmbH; Delta E as determined by a spectrophotometer (Color i7 manufactured by X-rite, Inc. as described in ASTM D 2244; Appearance after test as determined by visual examination; and Adhesion after test as determined by crosshatch adhesion test as described in ASTM D 3359.

Gloss retention was determined by a gloss meter (Micro-TRI-gloss) manufactured by BYK Gardner Corp. and Delta E as determined by a spectrophotometer (Color i7) manufactured by X-rite, Inc. as described in ASTM D 2244 were also conducted to measure each of nitric acid and muriatic acid resistances. As can be appreciated by reference to Table IV, the POLYOL A-based aqueous polyurethane dispersion (PUD) has superior detergent resistance and higher film hardness on vinyl substrate in AAMA 615-13.

TABLE II

| | PUD based on POLYOL | | | | | |
|---|---|---|---|---|---|---|
| | A | B | C | D | E | F |
| Dry time | | | | | | |
| Set-to-touch (minutes) | 30 | 20 | 15 | 15 | 15 | |
| Dry-hard (minutes) | 155 | 120 | 180 | 135 | 90 | |
| Film hardness | | | | | | |
| Pendulum hardness (sec) | 87 | 120 | 90 | 137 | 76 | 84 |
| Micro hardness (N/mm2) | 38.3 | 49.8 | 37.3 | 57.0 | 30.3 | 43 |
| Flexibility | | | | | | |
| Mandrel bend test @ 1/8 inch | Pass | Pass | Pass | Pass | Pass | Pass |
| BYK impact test (Direct) (in lbs.) | 90 | 100 | 90 | 90 | 90 | 110 |

TABLE III

| | PUD based on POLYOL | | | | | |
|---|---|---|---|---|---|---|
| | A | B | C | D | E | F |
| Chemical resistance | | | | | | |
| Muriatic acid (10%) | No effect | No effect | No effect | No effect | Soften/recover within 1 hour | No effect |
| Nitric acid (10%) | No effect | Soften | Soften/recover within 1 hour | No effect | Soften/recover within 1 hour | No effect |
| Sodium hydroxide (10%) | No effect | Slightly soften/recover within 1 hour | No effect | No effect | Slightly soften/recover within 1 hour | No effect |
| IPA | Soften/recover within 1 hour | Complete removal | Soften/recover within 1 hour | Soften/recover within 1 hour | Complete removal | Soften/recover within 1 hour |
| Detergent | No effect | No effect | Soften/recover within 1 hour | No effect | Soften/recover within 1 hour | No effect |
| Humidity resistance | | | | | | |
| Blister | None | Few | Medium | Medium | Medium | |

TABLE IV

| | PUD based on POLYOL | | | | | |
|---|---|---|---|---|---|---|
| | A | B | C | D | E | F |
| Pencil hardness on vinyl | 3H | F | H | F | F | 3H |
| Adhesion on vinyl | 5B | 5B | 5B | 5B | 5B | 5B |
| Detergent resistance | | | | | | |
| Gloss retention (%) | 114 | NT | NT | 79 | NT | 173 |
| Delta E | 0.2 | NT | NT | 0.2 | NT | 0.4 |
| Appearance after test | No blister | Severe blister | Deteriorated | Blister | Deteriorated | No blister |
| Adhesion after test | No loss of adhesion | Loss of adhesion | Loss of adhesion | Loss of adhesion | Loss of adhesion | No loss of adhesion |
| Nitric acid resistance | | | | | | |
| Gloss retention (%) | 126 | 141 | 127 | 134 | 137 | 134 |
| Delta E | 0.2 | 0.1 | 0.1 | 0.2 | 0.1 | 0.2 |
| Muriatic acid resistance | | | | | | |
| Gloss retention (%) | 105 | 102 | 106 | 107 | 104 | 103 |
| Delta E | 0.2 | 0.4 | 0.2 | 0.3 | 0.2 | 0.1 |

As can be appreciated by reference to Tables III and IV, the NMP-containing polyurethane dispersion (Dispersion A) and a substantially NMP-free polyurethane dispersion (Dispersion F) according to the instant invention showed similar performance in the tests.

"Glass transition temperature" ($T_g$) is given in ° C. and was determined by differential scanning calorimetry. Differential scanning calorimetry (DSC) was conducted on each of the polyols (Table V) and each of the aqueous polyurethane dispersions (PUDs) made with the respective polyols (Table VI) to determine the glass transition temperature of each material. The heating rate was 20° C./min.

Figure 2:
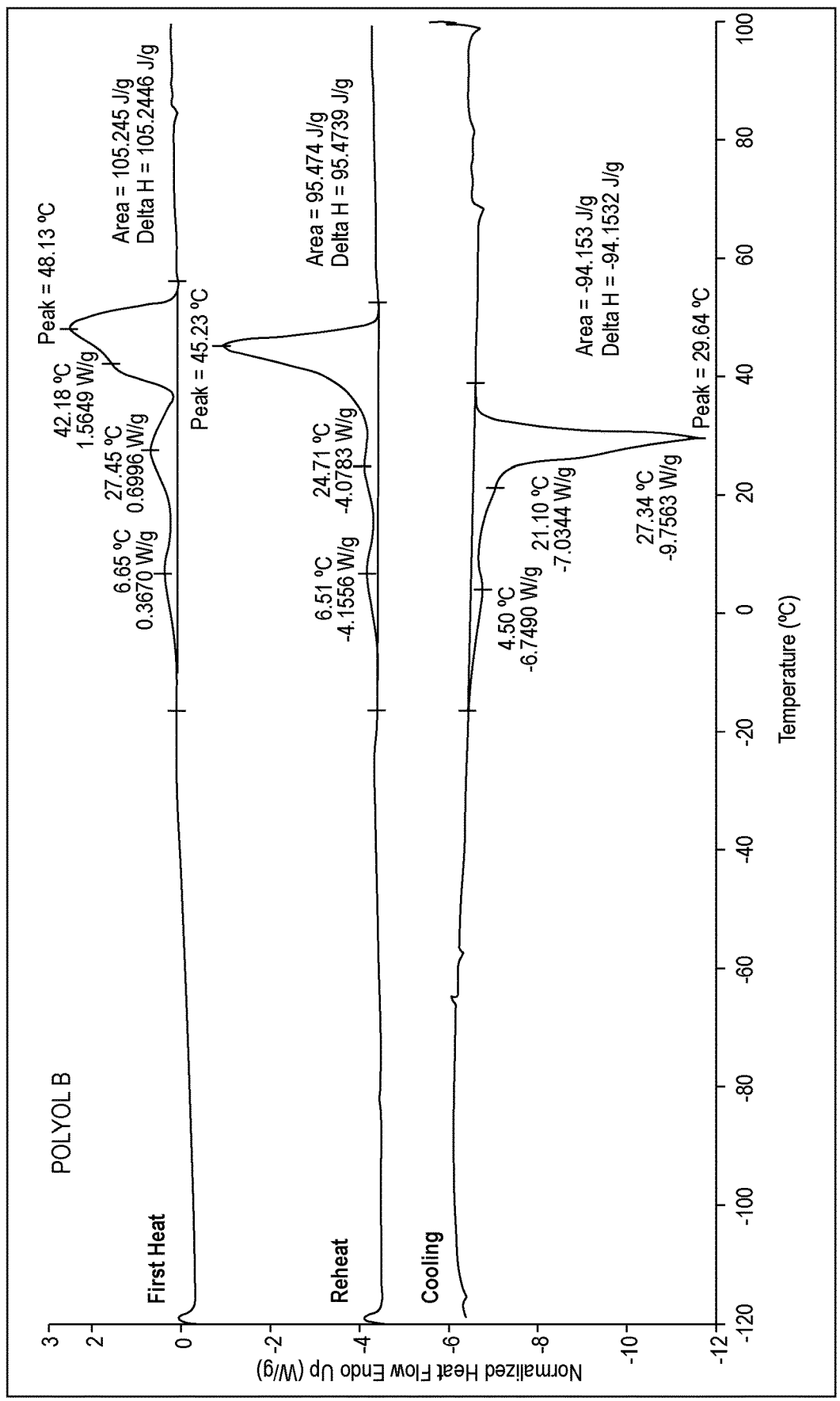
FIG. 2 is a differential scanning calorimetry (DSC) thermogram of POLYOL B.
Figure 3:
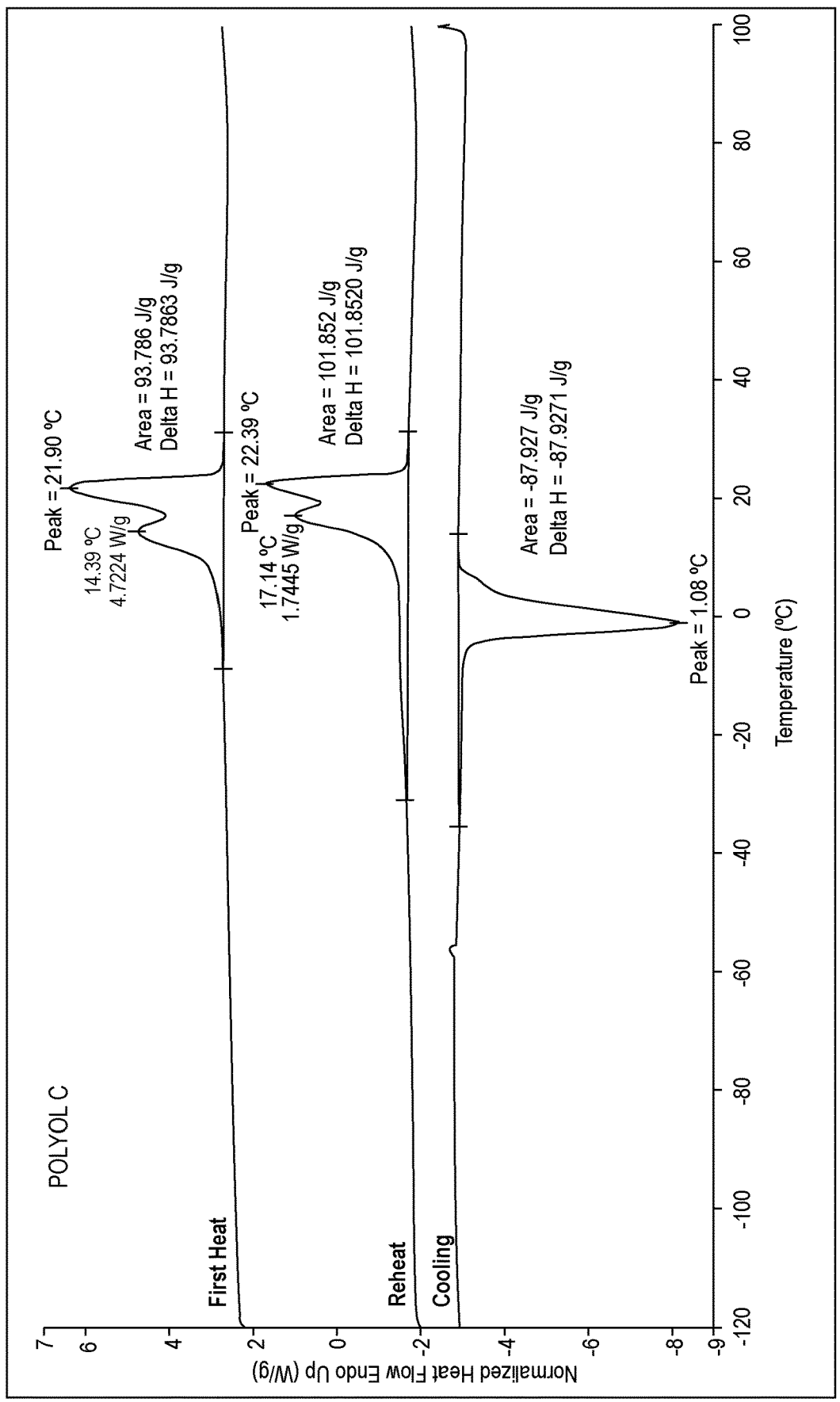
FIG. 3 is a differential scanning calorimetry (DSC) thermogram of POLYOL C.
Figure 4:
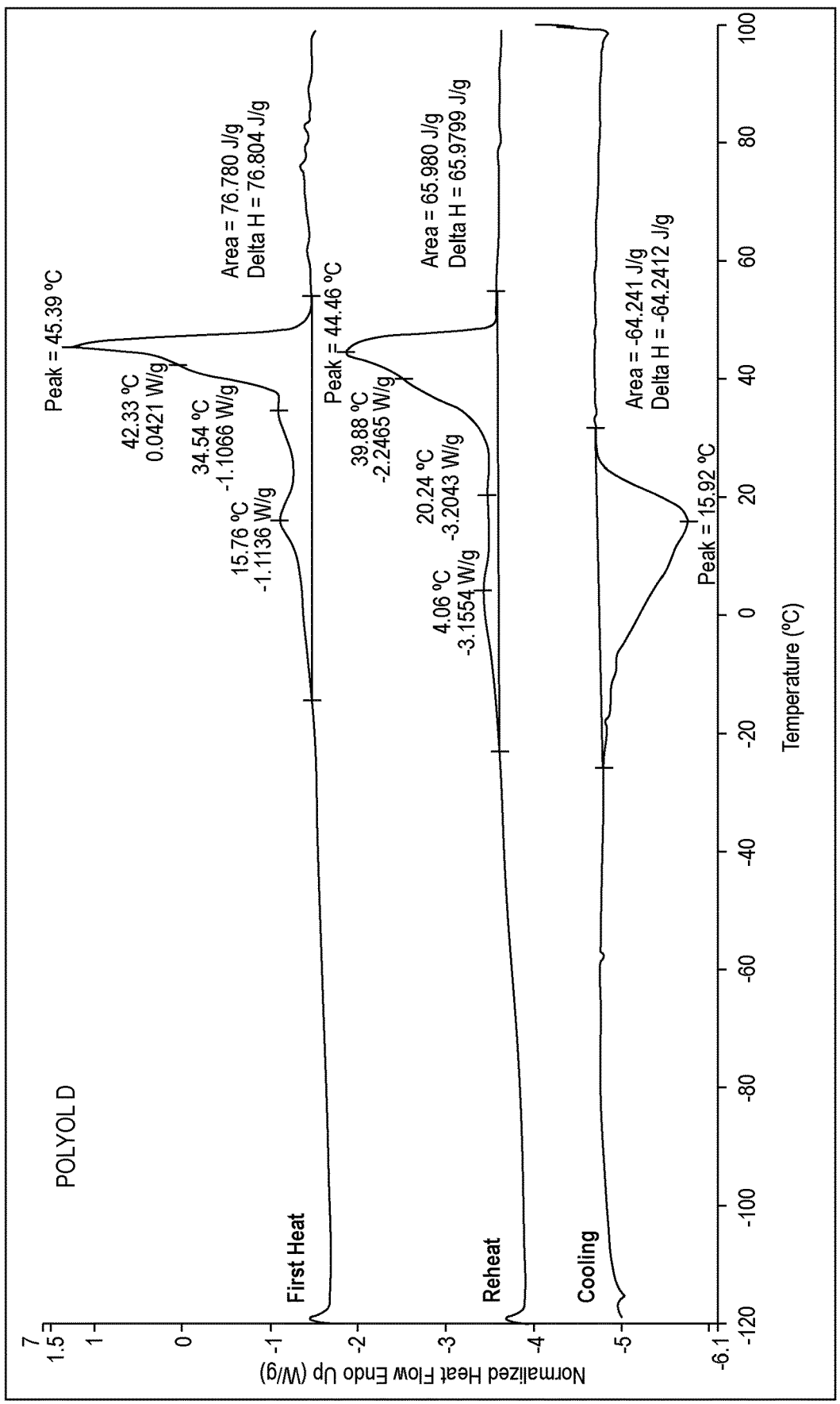
FIG. 4 is a differential scanning calorimetry (DSC) thermogram of POLYOL E.
Figure 5:
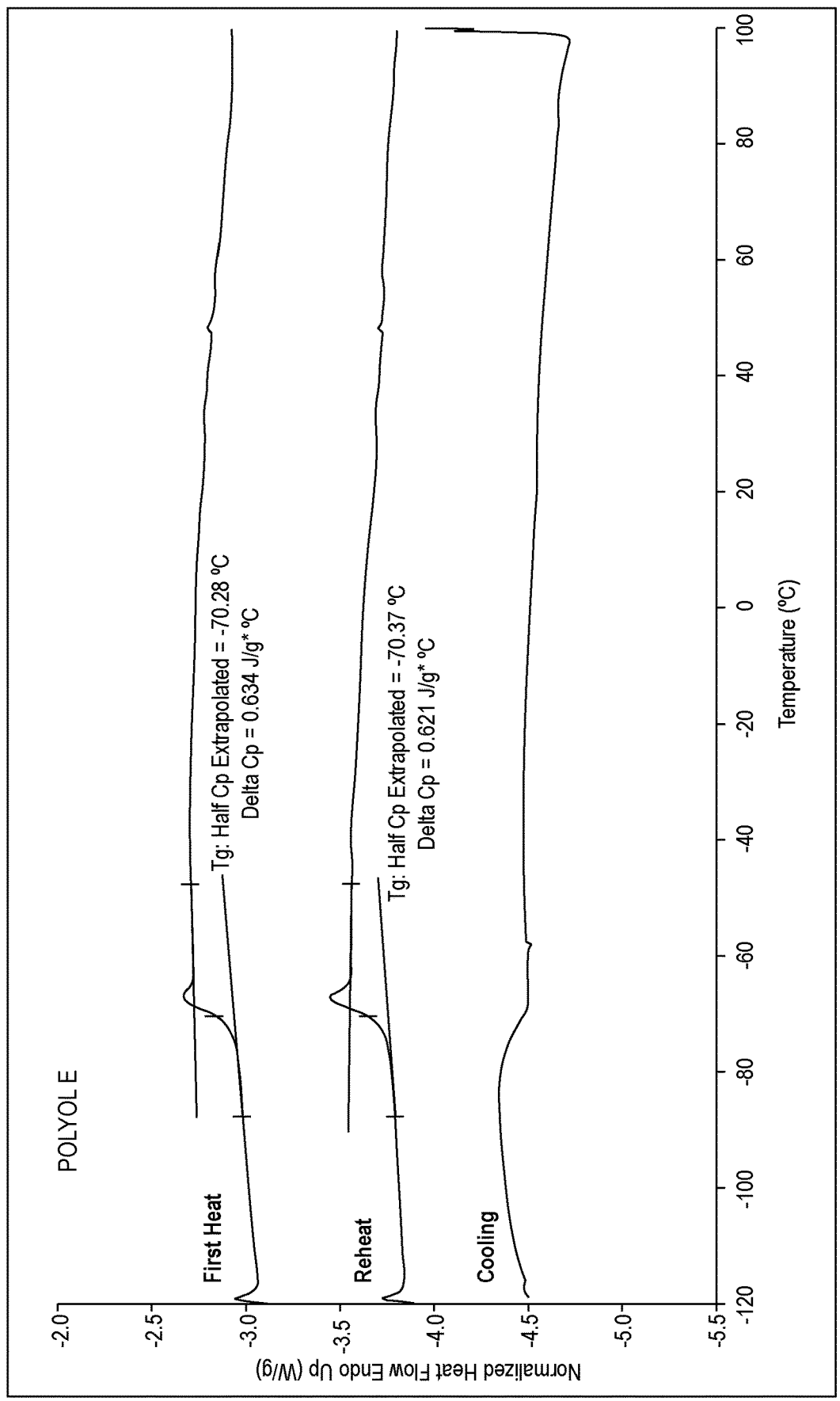
FIG. 5 is a differential scanning calorimetry (DSC) thermogram of POLYOL D.

FIG. 1 is a differential scanning calorimetry (DSC) thermogram of POLYOL A. FIG. 2 is a DSC thermogram of POLYOL B. FIG. 3 is a DSC thermogram of POLYOL C. FIG. 4 is a DSC thermogram of POLYOL E. FIG. 5 is a DSC thermogram of POLYOL D.

As can be appreciated by reference to Table V and FIGS. 1, 2, 3, 4 and 5, POLYOL A (ortho-phthalic based) and POLYOL E (polypropylene glycol based) are amorphous. Others such as POLYOL B (adipate based), POLYOL C (PTMEG based) and POLYOL D (polycarbonate based) are crystalline.

Figure 6:
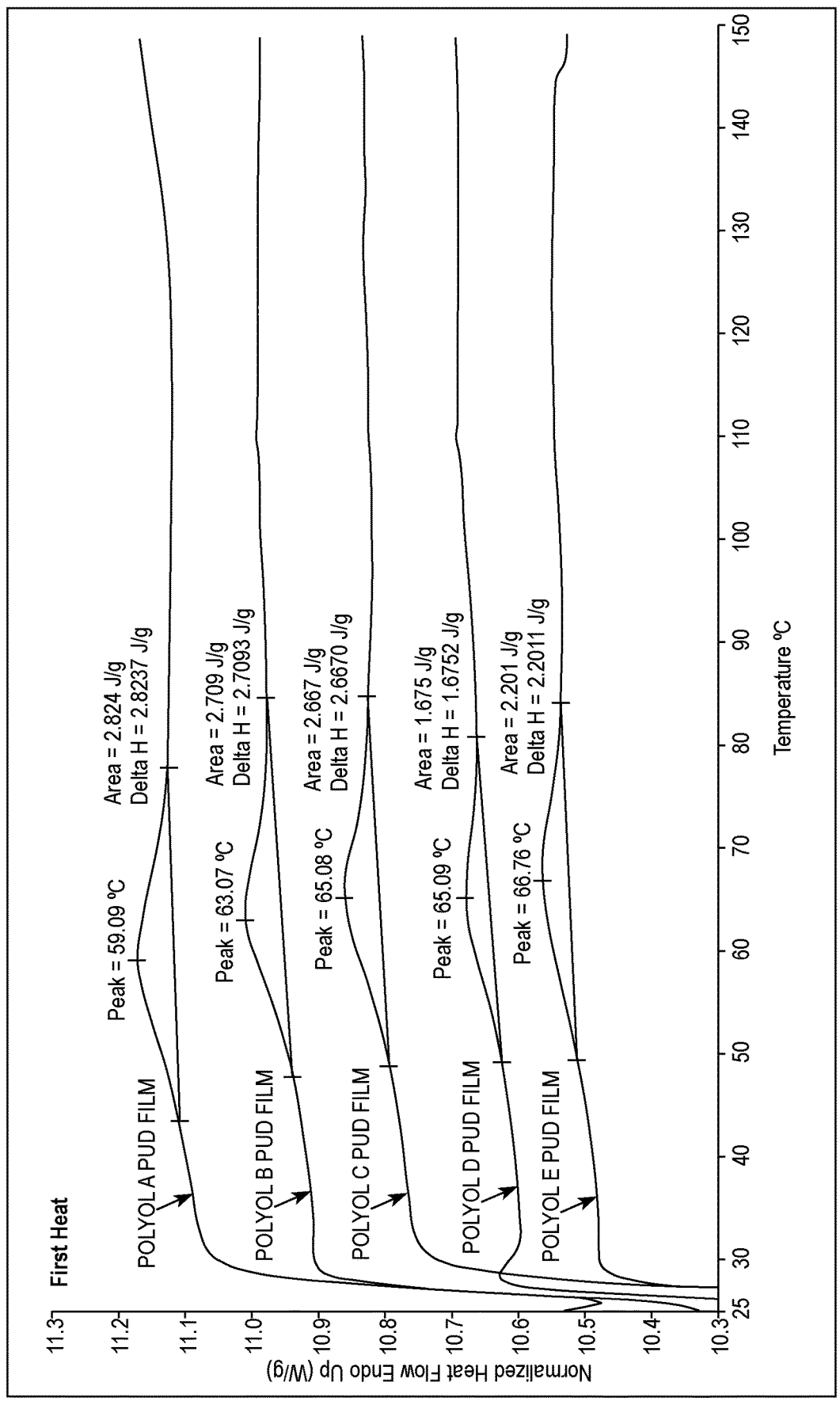
FIG. 6 is a differential scanning calorimetry (DSC) thermogram of the first heat of films made from the same polyurethane dispersion (PUD) and containing one of POLYOLS A, B, C, D, and E.
Figure 7:
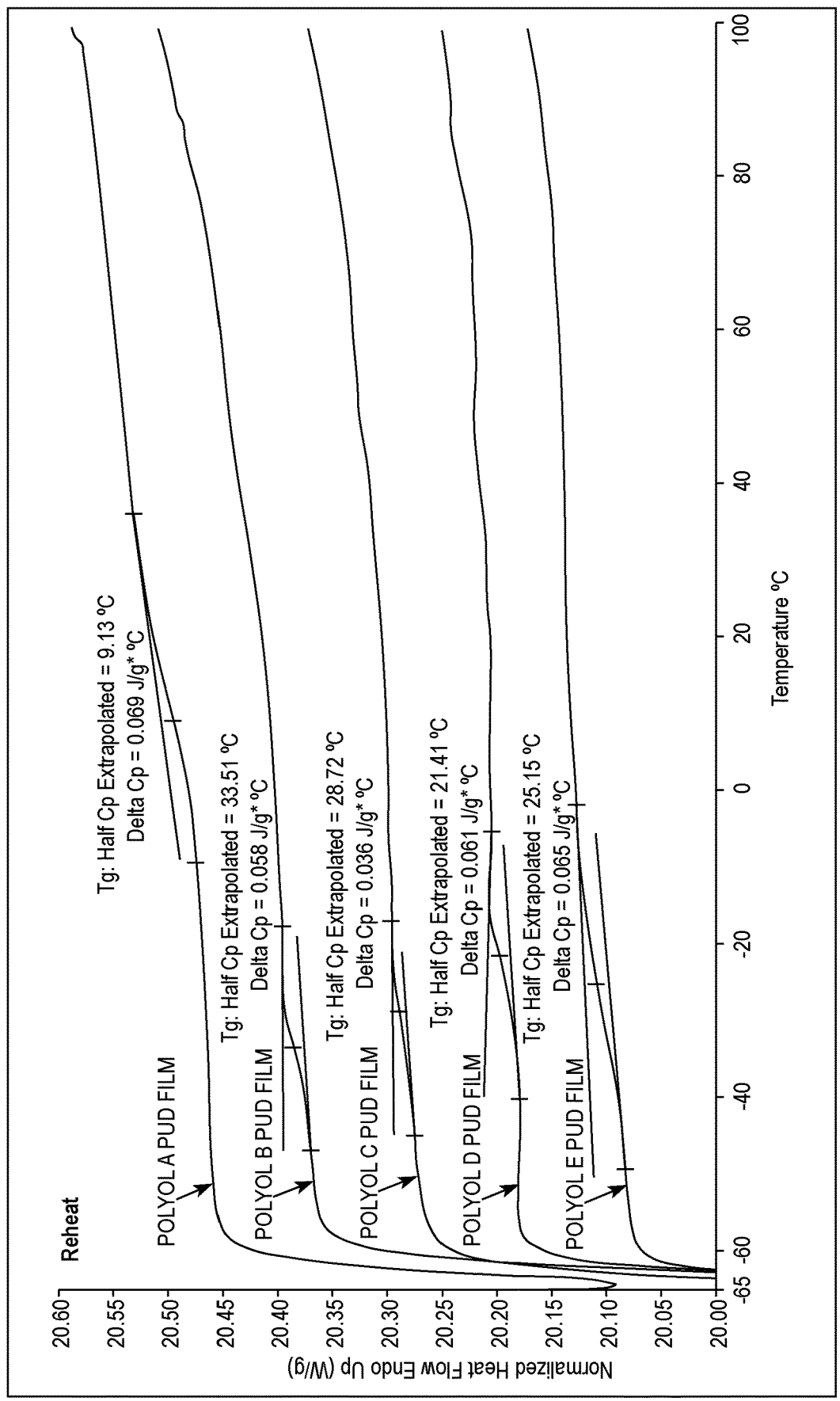
FIG. 7 is a differential scanning calorimetry (DSC) thermogram of the reheat of films made from the same polyurethane dispersion (PUD) and containing one of POLYOLS A, B, C, D, and E.

FIGS. 6 and 7 are DSC thermograms of films, each made from an identical polyurethane dispersion formulation containing a different one of POLYOLS A, B, C, D, and E.

TABLE VI

| Sample PUD Films | As-received samples 25 to 150° C. First Heat Tm (ΔHm) ° C. (J/g) | Sub-DSC −65 to 100° C. Reheat $T_g$ ($\Delta C_p$) ° C. (J/g° C.) |
|---|---|---|
| PUD based on POLYOL A | 59 (2.82) | 9 (0.07) |
| PUD based on POLYOL B | 63 (2.71) | −34 (0.06) |
| PUD based on POLYOL C | 65 (2.67) | −29 (0.04) |
| PUD based on POLYOL D | 65 (1.68) | −21 (0.06) |
| PUD based on POLYOL E | 67 (2.20) | −25 (0.07) |

As can be appreciated by reference to Table VI and FIGS. 6 and 7, the polyurethane dispersion based on POLYOL A

TABLE V

| | Sub-DSC −120 to 100° C. | | | | | |
|---|---|---|---|---|---|---|
| | First Heat | | Cooling | Reheat | | |
| Sample Polyols | $T_g$ ($\Delta C_p$) ° C. (J/g° C.) | Tm (ΔHm) ° C. (J/g) | Tc (ΔHc) ° C. (J/g) | $T_g$ ($\Delta C_p$) ° C. (J/g° C.) | Tm (ΔHm) ° C. (J/g) | Morphology |
| POLYOL A | −34 (0.43) | | | −36 (0.41) | | Amorphous |
| POLYOL B | | 7, 27, 42, 48* (105.24) | 4, 21, 27, 30* (94.15) | | 7, 25, 45* (95.47) | Crystalline |
| POLYOL C | | 14, 22* (93.79) | −1 (87.93) | | 17, 22* (101.85) | Crystalline |
| POLYOL D | | 16, 35, 42, 45* (76.78) | 16 (64.24) | | 4, 20, 40, 44* (65.98) | Crystalline |
| POLYOL E | −70 (0.63) | | | −70 (0.62) | | Amorphous |

*main peak in a multiple peak event (ortho-phthalic base) exhibited the highest glass transition temperature ($T_g$) at 9° C. among the five films tested. The others were below −20° C.

Betadine stain resistance for aqueous polyurethane dispersions (PUDs) which were made with the polyols listed in Table VII was assessed by a chemical spot test. As can be appreciated by reference to Table VII, the POLYOL A-based aqueous polyurethane dispersion (PUD) had better betadine stain resistance than any other aqueous polyurethane dispersions (PUDs).

TABLE VII

| | POLYOL A | POLYOL B | POLYOL C | POLYOL D | POLYOL E |
|---|---|---|---|---|---|
| 1 hour | No effect | Slightly stained | Stain | Slightly stained | Stain |
| 4 hours | No effect | Stain | Stain | Slightly stained | Stain |

TABLE VIII

| | Hard Block on TRS (%) | | | | | | | | |
|---|---|---|---|---|---|---|---|---|---|
| | 60 | | | 55 | | | 51 | | |
| Chain Ext % | 80 | 88 | 95 | 80 | 88 | 95 | 80 | 88 | 95.0 |
| Pencil hardness +10 days Detergent resistance | 3H | 6H | 3H | 4H | 3H | 2H | NT | H | H |
| Gloss retention (%) | 143.5 | 172.6 | 189.0 | 205.6 | 173.6 | Failed | NT | Failed | Failed |
| Delta E | 0.5 | 0.6 | 0.8 | 0.6 | 0.6 | Failed | NT | Failed | Failed |

Example 2

Various coating compositions including matting agents were prepared using various polyurethane dispersions to determine 60° gloss values and DPUR values for coatings prepared from each. A few comparative examples were also prepared employing polyacrylate resins instead of PUD resins, as polyacrylate resins are expected to have good DPUR values. Additionally, some commercially available paints were also tested as additional comparative examples.

Each coating composition in Table IX was drawn down on a scrub test panel at approximately 7 mils wet and subsequently cured at constant room temperature (24° Celsius/50% RH) for seven days to form the coating. 60° gloss for the coatings was determined by a gloss meter (Micro-TRI-gloss) manufactured by BYK Gardner Corp. DPUR for the coatings was performed by taking an initial color reading of individual coatings. A dirt slurry mixture consisting of three iron oxide pigments was prepared and painted onto a designated portion of the individual coatings using a brush. The slurry was left to dry on the panel for 24 hours. The slurry was washed off under tepid, running water while wiping gently with a wet, absorbent paper towel. A final color reading at respective designated portions for individual coatings was then taken and the delta yellowness index was recorded.

The results of these studies are presented below in Table IX.

TABLE IX

| Resin Chemistry | Product | P/B | % Solids | Matting Agent | 60° Gloss | DPUR |
|---|---|---|---|---|---|---|
| PUD | PUD based on Polyol A (See Example 1) | 1.09 | 44.99 | 3.1% Minex ®, 0.90% Diafil ® | 16 | 1.0 |
| PUD | BAYHDRYOL ® UH 2637 | 0.8 | 50.24 | 2% silica | 3 | 9.9 |
| PUD | BAYHDRYOL ® UH 2648 | 0.8 | 45.06 | 2% silica | 7 | 88.8 |
| PUD | BAYHDRYOL ® UH XP 2592 | 0.8 | 53.72 | 2% silica | 13 | 15.3 |
| PUD | DISPERCOLL ® U 42 | 0.91 | 59.13 | 2% silica, 3.5% wax | 10 | 91.9 |
| PUD | DISPERCOLL ® U 43 | 1.3 | 50.59 | 1.4% Minex ®, 0.4% Diafil ® | 8 | 73.2 |
| PUD | DISPERCOLL ® U 44 | 1.3 | 52.89 | 1.4% Minex ®, 0.4% Diafil ® | 10 | 58.5 |
| PUD | DISPERCOLL ® U 53 | 0.89 | 51.43 | 2% silica, 2.5% wax | 9 | 9.5 |
| PUD | IMPRANIL ® DL 1554 | 0.94 | 65.84 | 2% silica, 5% wax | 9 | 29.6 |
| PUD | IMPRANIL ® XP 2611 | 0.91 | 51.66 | 2% silica, 3% wax | 10 | 26.5 |
| PAC | BAYHDRYOL ® AH 2797 | 1.28 | 47.66 | 1.3% Minex ®, 0.4% Diafil ® | 7 | 1.7 |
| PAC | BAYHDRYOL ® AH 2814 | 1.32 | 50.46 | 1.4% Minex ®, 0.4% Diafil ® | 20 | 2.2 |
| PAC | BAYHDRYOL ® | 1.21 | 50.02 | 3.0% Minex ®, | 9 | 0.6 |

TABLE IX-continued

| Resin Chemistry | Product | P/B | % Solids | Matting Agent | 60° Gloss | DPUR |
|---|---|---|---|---|---|---|
| | AH 2846 | | | 1.4% Diafil ® | | |
| — | PPG SPEEDHIDE ® | — | — | — | 5 | 46.6 |
| — | SHERWIN WILLIAMS EMERALD ® | — | — | — | 4 | 73.1 |
| — | VALSPAR ® RESERVE ™ FLAT | — | — | — | 4 | 57.1 |

As can be seen from the results of Table IX, each of the formulated coating compositions achieved a 60° gloss value lower than or equal to 20, indicating a good matte finish (i.e. lower 60° gloss values represent greater matted finishes). Additionally, many of the formulated coating compositions had DPUR values lower than 20, indicated good dirt had DPUR values lower than 10, or even down to 1. It is noted that, of the three commercially available coatings tested, the lowest DPUR value was 46.6. As such, several of the PUD-based coating compositions demonstrated considerably improved dirt pick-up resistance as compared to the commercially available coatings.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicants reserve the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. An aqueous polyurethane dispersion (PUD) comprising the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) an amorphous polyester having a glass transition temperature (Tg) as determined by differential scanning calorimetry (DSC) of less than −30° C.; (v) water; (vi) a mono functional polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature (Tg) as determined by differential scanning calorimetry (DSC) of 0° C. to 20° C. and a hard block content of greater than 50%.

Clause 2. The aqueous polyurethane dispersion (PUD) according to Clause 1, wherein the amorphous polyester (iv) comprises ortho-phthalic anhydride.

Clause 3. The aqueous polyurethane dispersion (PUD) according to one of Clauses 1 and 2, wherein the dispersion has a hard block content of 50% to 60%.

Clause 4. The aqueous polyurethane dispersion (PUD) according to one of Clauses 1 to 3, wherein the dispersion has a hard block content of greater than 55% to 60%.

Clause 5. The aqueous polyurethane dispersion (PUD) according to one of Clauses 1 to 4, wherein the amorphous polyester (iv) has a molecular weight of 300 to 3000.

Clause 6. The aqueous polyurethane dispersion (PUD) according to one of Clauses 1 to 5, wherein the amorphous polyester (iv) has a molecular weight of 1000.

Clause 7. The aqueous polyurethane dispersion (PUD) according to one of Clauses 1 to 6, wherein the polyisocyanate (i) is selected from the group consisting of 1,6-hexamethylene diisocyanate (HDI), pentamethylene diisocyanate (PDI), isophorone diisocyanate (IPDI), 2,2,4- and 2,4,4-trimethyl-hexamethylene diisocyanate, isomeric bis-(4,4'-isocyanatocyclohexyl)methanes or mixtures thereof of any desired isomer content, 1,4-cyclohexylene diisocyanate, 1,4-phenylene diisocyanate, 2,4- and 2,6-toluene diisocyanate or hydrogenated 2,4- and 2,6-toluene diisocyanate, 1,5-naphthalene diisocyanate, 2,4'- and 4,4'-diphenylmethane diisocyanate, 1,3- and 1,4-bis-(2-isocyanato-prop-2-yl)benzene (TMXDI), 1,3-bis(isocyanato-methyl)benzene (XDI), and (S)-alkyl 2,6-diisocyanato-hexanoates or (L)-alkyl 2,6-diisocyanatohexanoates.

Clause 8. The aqueous polyurethane dispersion (PUD) according to one of Clauses 1 to 7, wherein the PUD contains n-methyl-2-pyrrolidone (NMP).

Clause 9. The aqueous polyurethane dispersion (PUD) according to one of Clauses 1 to 7, wherein the PUD is substantially free of n-methyl-2-pyrrolidone (NMP).

Clause 10. One of a coating, an adhesive, a paint, a primer, a topcoat, and a sealant comprising the aqueous polyurethane dispersion (PUD) according to one of Clauses 1 to 9.

Clause 11. A coating containing the aqueous polyurethane dispersion (PUD) according to one of Clauses 1 to 9, wherein the coating passes detergent resistance testing according to AAMA 615-13 with a minimum 90% gloss retention, a maximum color change of 5 delta E, with no blistering, with no loss of adhesion after testing and has a pencil hardness according to ASTM D3363 of at least 3H.

Clause 12. A coating containing the aqueous polyurethane dispersion (PUD) according to one of Clauses 1 to 9, wherein the coating exhibits no staining by betadine after four hours.

Clause 13. A coating containing the aqueous polyurethane dispersion (PUD) according to one of Clauses 1 to 9, wherein the coating passes humidity resistance testing according to ASTM D714 with no blistering.

Clause 14. The coating according to one of Clauses 11 to 13 having a pencil hardness according to ASTM D3363 of from 3H to 6H.

Clause 15. A substrate having applied thereto the coating according to one of Clauses 11 to 14.

Clause 16. The substrate according to Clause 15, wherein the substrate is polyvinylchloride.

Clause 17. The substrate according to Clause 16, wherein the substrate is selected from the group consisting of floors, windows, doors, window frames, door frames, window shutters, window surrounds railing, gates, pillars, arbors, pergolas, trellises, gazebos, posts, fencing, pipes and fittings, wire and cable insulation, automobile components, credit cards, cladding and siding.

Clause 18. The substrate according to Clause 15, wherein the substrate is selected from the group consisting of wood, polyamide (PA), polyethylene (PE), high-density polyethylene (HDPE), low-density polyethylene (LDPE), polyethylene terephthalate (PET), polytetrafluoroethylene (PTFE), polyester (PES), polypropylene (PP), polystyrene (PS), polyvinyl chloride (PVC), polyurethane (PU), thermoplastic polyurethane, epoxy, polycarbonate (PC), acrylonitrile butadiene styrene (ABS), polycarbonate/acrylonitrile butadiene styrene (PC/ABS), polyethylene/acrylonitrile butadiene styrene (PE/ABS), polymethyl methacrylate (PMMA), polybenzimidazole (PBI), polyoxymethylene (POM), concrete, masonry, textiles, metals, ceramics, composites, and glass.

Clause 19. A coating containing an aqueous polyurethane dispersion (PUD), wherein the coating passes detergent resistance testing according to AAMA 615-13 with a minimum 90% gloss retention, a maximum color change of 5 delta E, with no blistering and no loss of adhesion after testing, wherein the coating exhibits no staining by betadine after four hours, wherein the coating passes humidity resistance testing according to ASTM D714 with no blistering and wherein the coating has a pencil hardness according to ASTM D3363 of at least 3H.

Clause 20. The coating according to Clause 19, wherein the aqueous polyurethane dispersion (PUD) comprises the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) an amorphous polyester having a glass transition temperature (Tg) as determined by differential scanning calorimetry (DSC) of less than −30° C.; (v) water; (vi) a mono function al polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature (Tg) as determined by differential scanning calorimetry (DSC) of 0° C. to 20° C. and a hard block content of greater than 50%.

Clause 21. The coating according to Clause 20, wherein the amorphous polyester (iv) comprises ortho-phthalic anhydride.

Clause 22. The aqueous polyurethane dispersion (PUD) according to one of Clauses 19 to 21, wherein the PUD contains n-methyl-2-pyrrolidone (NMP).

Clause 23. The aqueous polyurethane dispersion (PUD) according to one of Clauses 19 to 22, wherein the PUD is substantially free of n-methyl-2-pyrrolidone (NMP).

Clause 24. A paint comprising an aqueous polyurethane dispersion (PUD), wherein the paint passes detergent resistance testing according to AAMA 615-13 with a minimum 90% gloss retention, a maximum color change of 5 delta E, no blistering and no loss of adhesion after testing, wherein the paint exhibits no staining by betadine after four hours, wherein the paint passes humidity resistance testing according to ASTM D714 with no blistering and wherein the paint has a pencil hardness according to ASTM D3363 of at least 3H.

Clause 25. The paint according to Clause 24, wherein the aqueous polyurethane dispersion (PUD) comprises the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) an amorphous polyester having a glass transition temperature (Tg) as determined by differential scanning calorimetry (DSC) of less than −30° C.; (v) water; (vi) a mono function al polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature (Tg) as determined by differential scanning calorimetry (DSC) of 0° C. to 20° C. and a hard block content of greater than 50%.

Clause 26. The paint according to Clause 24, wherein the amorphous polyester (iv) comprises ortho-phthalic anhydride.

Clause 27. The paint according to one of Clauses 24 to 28, wherein the PUD contains n-methyl-2-pyrrolidone (NMP).

Clause 28. The paint according to one of Clauses 24 to 26, wherein the PUD is substantially free of n-methyl-2-pyrrolidone (NMP).

Clause 29. A substrate having applied thereto the paint according to one of Clauses 24 to 28.

Clause 30. The substrate according to Clause 29, wherein the substrate comprises polyvinylchloride.

Clause 31. The substrate according to Clause 30, wherein the substrate is selected from the group consisting of floors, windows, doors, window frames, window surrounds, door frames, window shutters, railing, gates, pillars, arbors, pergolas, trellises, gazebos, posts, fencing, pipes and fittings, wire and cable insulation, automobile components, cladding and siding.

Claus 32. The substrate according to Clause 30, wherein the substrate is selected from the group consisting of wood, polyamide (PA), polyethylene (PE), high-density polyethylene (HDPE), low-density polyethylene (LDPE), polyethylene terephthalate (PET), polytetrafluoroethylene (PTFE), polyester (PES), polypropylene (PP), polystyrene (PS), polyvinyl chloride (PVC), polyurethane (PU), thermoplastic polyurethane, epoxy, polycarbonate (PC), acrylonitrile butadiene styrene (ABS), polycarbonate/acrylonitrile butadiene styrene (PC/ABS), polyethylene/acrylonitrile butadiene styrene (PE/ABS), polymethyl methacrylate (PMMA), polybenzimidazole (PBI), polyoxymethylene (POM), concrete, masonry, textiles, metals, ceramics, composites, and glass.

Clause 33. The paint according to Clause 24, further including at least one of binders, auxiliaries, pigments, dyes, matting agents, flow control additives, wetting additives, slip additives, metallic effect pigments, fillers, nanoparticles, light stabilizing particles, anti-yellowing additives, thickeners, and additives for reducing surface tension.

Clause 34. A low surface energy substrate having applied thereto a coating containing an aqueous polyurethane dispersion (PUD), wherein the coating passes detergent resistance testing according to AAMA 615-13 with a minimum 90% gloss retention, a maximum color change of 5 delta E, no blistering and no loss of adhesion after testing, wherein the coating exhibits no staining by betadine after four hours, wherein the coating passes humidity resistance testing according to ASTM D714 with no blistering and wherein the coating has a pencil hardness according to ASTM D3363 of at least 3H.

Clause 35. The low surface energy substrate according to Clause 34, wherein the substrate is selected from the group consisting of polyvinylchloride, polystyrene, polyvinyl acetate, polyvinyl alcohol, and polyacrylonitrile.

Clause 36. The low surface energy substrate according to one of Clauses 23 and 35, wherein the wherein the aqueous polyurethane dispersion (PUD) comprises the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) an amorphous polyester having a glass transition temperature ($T_g$) as determined by differential scanning calorimetry of less than −30° C.; (v) water, (vi) a mono functional polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature ($T_g$) as determined by differential scanning calorimetry of 0° C. to 20° C. an d a hard block content of greater than 50%.

Clause 37. The low surface energy substrate according to one of Clauses 34 to 36, wherein the PUD contains n-methyl-2-pyrrolidone (NMP).

Clause 38. The low surface energy substrate according to one of Clauses 34 to 36, wherein the PUD is substantially free of n-methyl-2-pyrrolidone (NMP).

Clause 39. The low surface energy substrate according to one of Clauses 34 to 36, wherein the substrate has a surface energy of from 12 mJ/m$^2$ to 60 mJ/m$^2$.

Clause 40. The low surface energy substrate according to one of Clauses 34 to 36, wherein the substrate has a surface energy of from 25 mJ/m$^2$ to 45 mJ/m$^2$.

Clause 41. The low surface energy substrate according to one of Clauses 34 to 36, wherein the substrate has a surface energy of 30 mJ/m$^2$ to 40 mJ/m$^2$.

Clause 42. A primer comprising an aqueous polyurethane dispersion (PUD), wherein the primer passes detergent resistance testing according to AAMA 615-13 with a minimum 90% gloss retention, a maximum color change of 5 delta E, no blistering and no loss of adhesion after testing, wherein the primer exhibits no staining by betadine after four hours, wherein the primer passes humidity resistance testing according to ASTM D714 with no blistering and wherein the primer has a pencil hardness according to ASTM D3363 of at least 3H.

Clause 43. The primer according to Clause 42, wherein the aqueous polyurethane dispersion (PUD) comprises the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) an amorphous polyester having a glass transition temperature (Tg) as determined by differential scanning calorimetry (DSC) of less than −30° C.; (v) water; (vi) a mono function al polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature (Tg) as determined by differential scanning calorimetry (DSC) of 0° C. to 20° C. and a hard block content of greater than 50%.

Clause 44. The primer according to Clause 42, wherein the amorphous polyester (iv) comprises ortho-phthalic anhydride.

Clause 45. The primer according to one of Clauses 42 to 44, wherein the PUD contains n-methyl-2-pyrrolidone (NMP).

Clause 46. The primer according to one of Clauses 42 to 44, wherein the PUD is substantially free of n-methyl-2-pyrrolidone (NMP).

Clause 47. A substrate having applied thereto the primer according to one of Clauses 42 to 26.

Clause 48. The substrate according to Clause 47, wherein the substrate is selected from the group consisting of floors, windows, doors, window frames, window surrounds, door frames, window shutters, railing, gates, pillars, arbors, pergolas, trellises, gazebos, posts, fencing, pipes and fittings, wire and cable insulation, automobile components, cladding and siding.

Clause 49. The substrate according to Clause 47, wherein the substrate is selected from the group consisting of wood, polyvinylchloride, polyamide (PA), polyethylene (PE), high-density polyethylene (HDPE), low-density polyethylene (LDPE), polyethylene terephthalate (PET), polytetrafluoroethylene (PTFE), polyester (PES), polypropylene (PP), polystyrene (PS), polyvinyl chloride (PVC), polyurethane (PU), thermoplastic polyurethane, epoxy, polycarbonate (PC), acrylonitrile butadiene styrene (ABS), polycarbonate/acrylonitrile butadiene styrene (PC/ABS), polyethylene/acrylonitrile butadiene styrene (PE/ABS), polymethyl methacrylate (PMMA), polybenzimidazole (PBI), polyoxymethylene (POM), concrete, masonry, textiles, metals, ceramics, composites, and glass.

Clause 50. The primer according to Clause 42, further including at least one of binders, auxiliaries, pigments, dyes, matting agents, flow control additives, wetting additives, slip additives, metallic effect pigments, fillers, nanoparticles, light stabilizing particles, anti-yellowing additives, thickeners, and additives for reducing surface tension.

Clause 51. A topcoat comprising an aqueous polyurethane dispersion (PUD), wherein the topcoat passes detergent resistance testing according to AAMA 615-13 with a minimum 90% gloss retention, a maximum color change of 5 delta E, no blistering and no loss of adhesion after testing, wherein the topcoat exhibits no staining by betadine after four hours, wherein the topcoat passes humidity resistance testing according to ASTM D714 with no blistering and wherein the topcoat has a pencil hardness according to ASTM D3363 of at least 3H.

Clause 52. The topcoat according to Clause 51, wherein the aqueous polyurethane dispersion (PUD) comprises the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) an amorphous polyester having a glass transition temperature (Tg) as determined by differential scanning calorimetry (DSC) of less than −30° C.; (v) water; (vi) a mono function al polyalkylene ether; (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature (Tg) as determined by differential scanning calorimetry (DSC) of 0° C. to 20° C. and a hard block content of greater than 50%.

Clause 53. The topcoat according to Clause 51, wherein the amorphous polyester (iv) comprises ortho-phthalic anhydride.

Clause 54. The topcoat according to one of Clauses 51 to 53, wherein the PUD contains n-methyl-2-pyrrolidone (NMP).

Clause 55. The topcoat according to one of Clauses 51 to 53, wherein the PUD is substantially free of n-methyl-2-pyrrolidone (NMP).

Clause 56. A substrate having applied thereto the topcoat according to one of Clauses 51 to 55.

Clause 57. The substrate according to Clause 56, wherein the substrate is selected from the group consisting of floors, windows, doors, window frames, window surrounds, door frames, window shutters, railing, gates, pillars, arbors, pergolas, trellises, gazebos, posts, fencing, pipes and fittings, wire and cable insulation, automobile components, cladding and siding.

Clause 58. The substrate according to Clause 56, wherein the substrate is selected from the group consisting of wood, polyvinylchloride, polyamide (PA), polyethylene (PE), high-density polyethylene (HDPE), low-density polyethylene (LDPE), polyethylene terephthalate (PET), polytetrafluoroethylene (PTFE), polyester (PES), polypropylene (PP), polystyrene (PS), polyvinyl chloride (PVC), polyurethane (PU), thermoplastic polyurethane, epoxy, polycarbonate (PC), acrylonitrile butadiene styrene (ABS), polycarbonate/acrylonitrile butadiene styrene (PC/ABS), polyethylene/acrylonitrile butadiene styrene (PE/ABS), polymethyl methacrylate (PMMA), polybenzimidazole (PBI), polyoxymethylene (POM), concrete, masonry, textiles, metals, ceramics, composites, and glass.

Clause 59. The topcoat according to Clause 51, further including at least one of binders, auxiliaries, pigments, dyes, matting agents, flow control additives, wetting additives, slip additives, metallic effect pigments, fillers, nanoparticles, light stabilizing particles, anti-yellowing additives, thickeners, and additives for reducing surface tension.

Clause 60. A coating composition, comprising: an aqueous polyurethane dispersion (PUD) comprising the reaction product of: (i) a polyisocyanate, (ii) a polymeric polyol having a number average molecular weight of 400 to 8,000 g/mol, (iii) a compound comprising at least one isocyanate-reactive group and an anionic group or potentially anionic group, (iv) an amorphous polyester having a glass transition temperature ($T_g$) as determined by differential scanning calorimetry (DSC) of less than −30° C., (v) water, (vi) a mono functional polyalkylene ether, (vii) a polyol having a molecular weight of less than <400 g/mol, and (viii) a polyamine or amino alcohol having a molecular weight of 32 to 400 g/mol, wherein the aqueous polyurethane dispersion (PUD) has a glass transition temperature ($T_g$) as determined by differential scanning calorimetry (DSC) of 0° C. to 20° C. and a hard block content of greater than 50%; and a pigment, wherein the coating composition has a solids content of at least 30 wt % based on a total weight of the coating composition.

Clause 61. The coating composition of Clause 60, wherein the PUD is present in the coating composition in an amount of from about 45 wt % to about 75 wt % based on a total weight of the coating composition.

Clause 62. The coating composition of Clause 60, wherein PUD solids comprise from about 40 wt % to about 70 wt % of total solids content of the coating composition.

Clause 63. The coating composition of Clause 60, wherein the amorphous polyester (iv) comprises ortho-phthalic anhydride.

Clause 64. The coating composition of Clause 60, wherein the PUD has a hard block content of 50% to 60%.

Clause 65. The coating composition of Clause 60, wherein the PUD has a hard block content of greater than 55% to 60%.

Clause 66. The coating composition of Clause 60, wherein the polyisocyanate (i) is selected from the group consisting of 1,6-hexamethylene diisocyanate (HDI), pentamethylene diisocyanate (PDI), isophorone diisocyanate (IPDI), 2,2,4- and 2,4,4-trimethyl-hexamethylene diisocyanate, isomeric bis-(4,4'-isocyanatocyclohexyl)methanes or mixtures thereof of any desired isomer content, 1,4-cyclohexylene diisocyanate, 1,4-phenylene diisocyanate, 2,4- and 2,6-toluene diisocyanate or hydrogenated 2,4- and 2,6-toluene diisocyanate, 1,5-naphthalene diisocyanate, 2,4'- and 4,4'-diphenylmethane diisocyanate, 1,3- and 1,4-bis-(2-isocyanato-prop-2-yl)-benzene (TMXDI), 1,3-bis(isocyanato-methyl)benzene (XDI), and (S)-alkyl 2,6-diisocyanatohexanoates or (L)-alkyl 2,6-diisocyanatohexanoates.

Clause 67. The coating composition of Clause 60, wherein the polymeric polyol has a hydroxyl number of from about 20 to about 400 KOH/g of polymeric polyol.

Clause 68. The coating composition of Clause 60, wherein the PUD contains n-methyl-2-pyrrolidone (NMP).

Clause 69. The coating composition of Clause 60, wherein the PUD is substantially free of n-methyl-2-pyrrolidone (NMP).

Clause 70. The coating composition of Clause 60, wherein the pigment comprises a black pigment, a blue pigment, a brown pigment, a cyan pigment, a gold pigment, a green pigment, a grey pigment, a magenta pigment, an orange pigment, a pink pigment, a red pigment, a violet pigment, a white pigment, a yellow pigment, or a combination thereof.

Clause 71. The coating composition of Clause 60, wherein the pigment is present in the coating composition in an amount of from about 5 wt % to about 40 wt % based on a total weight of the coating composition.

Clause 72. The coating composition of Clause 60, further comprising a thickener.

Clause 73. The coating composition of Clause 72, wherein the thickener comprises a cellulosic thickening agent, a starch thickening agent, an acrylic thickening agent, an associative thickening agent, a clay thickening agent, guar, alginate, pectin, xanthene, tragacanth, starch, or a combination thereof.

Clause 74. The coating composition of Clause 72, wherein the thickener is present in the coating composition in an amount of from about 0.1 wt % to about 3 wt % based a total weight of the coating composition.

Clause 75. The coating composition of Clause 60, wherein the coating composition further comprises a matting agent.

Clause 76. The coating composition of Clause 75, wherein the matting agent comprises a silica matting agent, a wax matting agent, a filler matting agent, or a combination thereof.

Clause 77. The coating composition of Clause 75, wherein the matting agent is present in the coating composition in an amount of from about 0.1 wt % to about 3 wt % based a total weight of the coating composition.

Clause 78. The coating composition of Clause 60, further comprising a thickener and a matting agent.

Clause 79. The coating composition of Clause 78, wherein the matting agent and the thickener are present in the coating composition at a weight ratio of from about 1:2 to about 2:1.

Clause 80. The coating composition of Clause 60, further comprising a wetting agent.

Clause 81. The coating composition of Clause 80, wherein the wetting agent is present in the coating composition in an amount from about 0.5 wt % to about 3 wt % based on a total weight of the composition.

Clause 82. The coating composition of Clause 60, further comprising a leveling agent.

Clause 83. The coating composition of Clause 82, wherein the leveling agent is present in the coating composition in an amount of from about 0.1 wt % to about 1 wt % based on a total weight of the composition.

Clause 84. The coating composition of Clause 60, wherein the coating composition includes from about 35 wt % to about 70 wt % solids based on a total weight of the coating composition.

Clause 85. The coating composition of Clause 60, wherein the coating composition has a pigment to binder ratio of from about 0.7 to about 1.7.

Clause 86. The coating composition of Clause 60, wherein the coating composition has a pigment volume concentration of from about 20% to about 40%.

Clause 87. The coating composition of Clause 60, wherein the coating composition has a density of from about 5 pounds per gallon (lbs/gal) to about 15 lbs/gal.

Clause 88. A coated substrate, comprising: a substrate; and a coating composition according to any one of Clauses 60 through 87 applied to a surface of the substrate to form a surface coating.

Clause 87. The coated substrate of Clause 88, wherein the surface coating has a 60° gloss value of less than or equal to 25.

Clause 88. The coated substrate of Clause 88, wherein the surface coating has a dirt pick-up resistance (DPUR) value of less than or equal to 10.

What is claimed is:

1. A coating composition, comprising:
   an aqueous polyurethane dispersion (PUD) comprising the reaction product of:
   (i) a polyisocyanate,
   (iii) a compound comprising at least one isocyanate-reactive group and an anionic group or potentially anionic group,
   (iv) an amorphous polyester having a glass transition temperature (Tg) as determined by differential scanning calorimetry (DSC) of less than −30° C. and comprising ortho-phthalic anhydride,
   (v) water,
   (vi) a mono functional polyalkylene ether,
   (vii) a polyol having a molecular weight of less than <400 g/mol, and
   (viii) a polyamine or amino alcohol having a molecular weight of 32 to 400 g/mol,
   wherein the aqueous polyurethane dispersion (PUD) has a glass transition temperature (Tg) as determined by differential scanning calorimetry (DSC) of 0° C. to 20° C. and a hard block content of greater than 50%; and
   a pigment;
   wherein the coating composition has a solids content of at least 30 wt % based on a total weight of the coating composition.

2. The coating composition of claim 1, wherein PUD solids comprise from about 40 wt % to about 70 wt % of total solids content of the coating composition.

3. The coating composition of claim 1, wherein the polyisocyanate (i) is selected from the group consisting of 1,6-hexamethylene diisocyanate (HDI), pentamethylene diisocyanate (PDI), isophorone diisocyanate (IPDI), 2,2,4- and 2,4,4-trimethyl-hexamethylene diisocyanate, isomeric bis-(4,4'-isocyanatocyclohexyl)methanes or mixtures thereof of any desired isomer content, 1,4-cyclohexylene diisocyanate, 1,4-phenylene diisocyanate, 2,4- and 2,6-toluene diisocyanate or hydrogenated 2,4- and 2,6-toluene diisocyanate, 1,5-naphthalene diisocyanate, 2,4'- and 4,4'-diphenylmethane diisocyanate, 1,3- and 1,4-bis-(2-isocyanato-prop-2-yl)-benzene (TMXDI), 1,3-bis(isocyanato-methyl)benzene (XDI), and (S)-alkyl 2,6-diisocyanatohexanoates or (L)-alkyl 2,6-diisocyanatohexanoates.

4. The coating composition of claim 1, wherein the polymeric polyol has a hydroxyl number of from about 20 to about 400 KOH/g of polymeric polyol.

5. The coating composition of claim 1, wherein the amorphous polyester has a molecular weight of from about 300 g/mol to about 3000 g/mol.

6. The coating composition of claim 1, wherein the pigment is present in the coating composition in an amount of from about 5 wt % to about 40 wt % based on a total weight of the coating composition.

7. The coating composition of claim 1, further comprising a thickener in an amount of from about 0.1 wt % to about 3 wt % based on a total weight of the coating composition.

8. The coating composition of claim 1, further comprising a matting agent in an amount of from about 0.1 wt % to about 3 wt % based on a total weight of the coating composition.

9. The coating composition of claim 1, further comprising a thickener and a matting agent.

10. The coating composition of claim 9, wherein the matting agent and the thickener are present in the coating composition at a weight ratio of from about 1:2 to about 2:1.

11. The coating composition of claim 1, further comprising a wetting agent in an amount from about 0.5 wt % to about 3 wt % based on a total weight of the composition.

12. The coating composition of claim 1, further comprising a leveling agent in an amount of from about 0.1 wt % to about 1 wt % based on a total weight of the composition.

13. The coating composition of claim 1, wherein the coating composition includes from about 35 wt % to about 70 wt % solids based on a total weight of the coating composition.

14. The coating composition of claim 1, wherein the coating composition has a pigment volume concentration of from about 20% to about 40%.

15. The coating composition of claim 1, wherein the coating composition has a density of from about 5 pounds per gallon (lbs/gal) to about 15 lbs/gal.

16. A coated substrate, comprising:
    a substrate; and
    a coating composition according to claim 1 applied to a surface of the substrate to form a surface coating.

17. The coated substrate of claim 16, wherein a primer composition is applied between the substrate and the coating composition.

18. The coated substrate of claim 16, wherein the surface coating has a 60° gloss value of less than or equal to 25.

19. The coated substrate of claim 16, wherein the surface coating has a dirt pick-up resistance (DPUR) value of less than or equal to 10.

* * * * *